(12) United States Patent
Jiang et al.

(10) Patent No.: US 11,564,282 B2
(45) Date of Patent: Jan. 24, 2023

(54) DISCONTINUOUS RECEPTION PARAMETER INDICATION METHOD, RELEVANT DEVICE AND SYSTEM

(71) Applicant: VIVO MOBILE COMMUNICATION CO., LTD., Chang'an Dongguan (CN)

(72) Inventors: Dajie Jiang, Chang'an Dongguan (CN); Xueming Pan, Chang'an Dongguan (CN); Yu Ding, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 57 days.

(21) Appl. No.: 16/632,216

(22) PCT Filed: Jun. 28, 2018

(86) PCT No.: PCT/CN2018/093323
§ 371 (c)(1),
(2) Date: Jan. 17, 2020

(87) PCT Pub. No.: WO2019/015458
PCT Pub. Date: Jan. 24, 2019

(65) Prior Publication Data
US 2020/0214078 A1 Jul. 2, 2020

(30) Foreign Application Priority Data
Jul. 20, 2017 (CN) .......................... 201710617115.9

(51) Int. Cl.
*H04W 76/28* (2018.01)
*H04W 52/02* (2009.01)
(Continued)

(52) U.S. Cl.
CPC ....... *H04W 76/28* (2018.02); *H04W 52/0229* (2013.01); *H04W 52/0248* (2013.01);
(Continued)

(58) Field of Classification Search
None
See application file for complete search history.

(56) References Cited

U.S. PATENT DOCUMENTS 9,872,252 B1 * 1/2018 Ang .................. H04W 52/0229
2007/0135081 A1 6/2007 Bultan et al.
(Continued)

FOREIGN PATENT DOCUMENTS

| CN | 101031152 A | 9/2007 |
| CN | 102932882 A | 2/2013 |

(Continued)

OTHER PUBLICATIONS

C.-C. Tseng, H.-C. Wang, F.-C. Kuo, K.-C. Ting, H.-H. Chen and G.-Y. Chen, "Delay and Power Consumption in LTE/LTE-A DRX Mechanism With Mixed Short and Long Cycles," in IEEE Transactions on Vehicular Technology, vol. 65, No. 3, pp. 1721-1734, Mar. 2016, doi: 10.1109/TVT.2015.2405560. (Year: 2016).*

(Continued)

*Primary Examiner* — Alex Skripnikov
(74) *Attorney, Agent, or Firm* — von Briesen & Roper, s.c.

(57) ABSTRACT

A DRX parameter indication method, a relevant device and a system are provided. The DRX parameter indication method includes: generating a signal or a payload, the signal or the payload being used to indicate a DRX parameter; and transmitting the signal to a UE, or transmitting the payload to the UE on a channel.

20 Claims, 10 Drawing Sheets

(51) Int. Cl.
*H04W 72/04* (2009.01)
*H04W 72/12* (2009.01)

(52) U.S. Cl.
CPC ..... *H04W 52/0274* (2013.01); *H04W 72/042* (2013.01); *H04W 72/1257* (2013.01)

(56) References Cited

U.S. PATENT DOCUMENTS

| | | | |
|---|---|---|---|
| 2012/0275364 | A1 | 11/2012 | Anderson et al. |
| 2014/0036853 | A1* | 2/2014 | Kim ...................... H04L 5/0053 370/329 |
| 2014/0050191 | A1* | 2/2014 | Kim ...................... H04L 5/0053 370/329 |
| 2015/0131505 | A1 | 5/2015 | Dai |
| 2018/0184246 | A1* | 6/2018 | Ryu ...................... H04W 68/06 |

FOREIGN PATENT DOCUMENTS

| | | |
|---|---|---|
| CN | 103391549 A | 11/2013 |
| CN | 103402245 A | 11/2013 |
| CN | 103889039 A | 6/2014 |
| CN | 104363624 A | 2/2015 |
| WO | WO 2016/146147 A1 | 9/2016 |

OTHER PUBLICATIONS

Chinese First Office Action Application No. 201710617115.9; dated Dec. 27, 2019.
Chinese Second Office Action Application No. 201710617115.9; dated Apr. 14, 2020.
Chinese Search Report Application No. 201710617115.9; dated Apr. 15, 2019.
European Search Report Application No. 18835774.3; dated Jul. 3, 2020.
International Search Report & Written Opinion related to Application No. PCT/CN2018/093323; dated Sep. 4, 2018.
Intel Corporation; "Support of semi-persistent scheduling for feNB-IoT", 3GPP TSG RAN WG1 Meeting #89, R1-1707321, Hangzhou, P.R. China, May 15, 2017-May 19, 2017.
Chinese Office Action for related Chinese Application No. 201710617115.9; dated Dec. 11, 2020.

* cited by examiner

DISCONTINUOUS RECEPTION PARAMETER INDICATION METHOD, RELEVANT DEVICE AND SYSTEM

CROSS-REFERENCE TO RELATED APPLICATION

This patent application is a 35 USC § 371 U.S. national stage of International Application No. PCT/CN2018/093323 filed on Jun. 28, 2018, which claims a priority of Chinese Patent Application No. 201710617115.9 filed on Jul. 20, 2017, which is incorporated herein by reference in its entirety.

TECHNICAL FIELD

The present disclosure relates to the field of communication technology, in particular to a Discontinuous Reception (DRX) parameter indication method, a relevant device and a system.

BACKGROUND

In a communication system, in order to reduce the power consumption for a User Equipment (UE), usually blind detection is performed by the UE using a DRX mechanism, e.g., the blind detection is performed on a Physical Downlink Control Channel (PDCCH) using the DRX mechanism. However, currently a DRX parameter is configured by a base station for the UE through high-layer signaling, so the configuration of the DRX parameter is of insufficient flexibility. For example, the DRX parameter is usually configured to fixed values, but not flexibly adjusted in accordance with different requirements on different services. Due to the insufficient flexibility of the configuration of the DRX parameter, the probability of acquiring no data increases remarkably when the blind detection is performed by the UE on the PDCCH, resulting in serious power consumption for the UE.

SUMMARY

In one aspect, the present disclosure provides in some embodiments a DRX parameter indication method for a base station, including: generating a signal or a payload, the signal or the payload being used to indicate a DRX parameter; and transmitting the signal to a UE, or transmitting the payload to the UE via a channel.

In another aspect, the present disclosure provides in some embodiments a DRX parameter indication method for a UE, including: receiving a signal or a payload from a base station, the signal or the payload being used to indicate a DRX parameter; and acquiring the DRX parameter indicated by the signal or the payload. The payload is transmitted via a channel.

In yet another aspect, the present disclosure provides in some embodiments a base station, including: a generation module configured to generate a signal or a payload, the signal or the payload being used to indicate a DRX parameter; and a signal transmission module configured to transmit the signal to a UE, or transmit the payload to the UE via a channel.

In still yet another aspect, the present disclosure provides in some embodiments a UE, including: a reception module configured to receive a signal or a payload from a base station, the signal or the payload being used to indicate a DRX parameter; and an acquisition module configured to acquire the DRX parameter indicated by the signal or the payload. The payload is transmitted via a channel.

In still yet another aspect, the present disclosure provides in some embodiments a base station, including a memory, a processor, and a computer program stored in the memory and executed by the processor. The processor is configured to execute the computer program so as to implement the above-mentioned DRX parameter indication method for the base station.

In still yet another aspect, the present disclosure provides in some embodiments a UE, including a memory, a processor, and a computer program stored in the memory and executed by the processor. The processor is configured to execute the computer program so as to implement the above-mentioned DRX parameter indication method for the UE.

In still yet another aspect, the present disclosure provides in some embodiments a computer-readable storage medium storing therein a computer program. The computer program is executed by a processor so as to implement the above-mentioned DRX parameter indication method for the base station.

In still yet another aspect, the present disclosure provides in some embodiments a computer-readable storage medium storing therein a computer program. The computer program is executed by a processor so as to implement the above-mentioned DRX parameter indication method for the UE.

In still yet another aspect, the present disclosure provides in some embodiments a DRX parameter indication system including the above-mentioned base station and UE.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
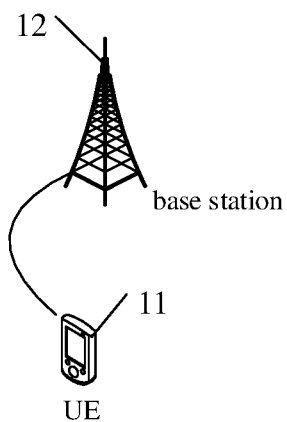
FIG. 1 is a schematic view showing a DRX parameter indication system according to one embodiment of the present disclosure.

FIG. 1 shows a DRX parameter indication system according to one embodiment of the present disclosure. As shown in FIG. 1, the DRX parameter indication system includes a UE 11 and a base station 12. The UE 11 may be a terminal side device such as a mobile phone, a tablet personal computer, a laptop computer, a Personal Digital Assistant (PDA), a Mobile Internet Device (MID) or a wearable device. It should be appreciated that, the types of the UE 11 will not be particularly defined herein. The base station 12 may be a $5^{th}$-Generation (5G) base station (e.g., gNB, 5G New Radio (NR) Node B (NB)), or a $4^{th}$-Generation (4G) base station (e.g., an evolved Node B (eNB)), or a $3^{rd}$-Generation (3G) base station (e.g., NB), or any network side device in an evolved communication version that may occur in the future. It should be appreciated that, the types of the base station 12 will not be particularly defined herein.

It should be appreciated that, functions of the UE 11 and the base station 12 will be described hereinafter in conjunction with the embodiments.

Figure 2:
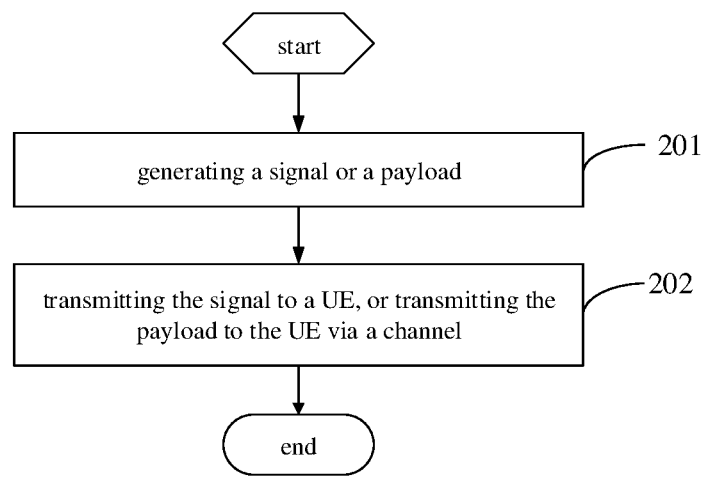
FIG. 2 is a flow chart of a DRX parameter indication method according to one embodiment of the present disclosure.

The present disclosure provides in some embodiments a DRX parameter indication method for a base station which, as shown in FIG. 2, includes the following steps.

Step 201: generating a signal or a payload, the signal or payload being used to indicate a DRX parameter.

The signal may be a wake-up signal (WUS) or a go-to-sleep signal. When the DRX parameter is indicated by the signal, it may be indicated by indication information included in the signal, or by energy or amplitude of the signal, or by the payload of the signal, which will not be particularly defined herein. In a possible embodiment of the present disclosure, the DRX parameter may be a connected DRX (CDRX) parameter. Of course, the DRX parameter may not be limited thereto, and it may also be a DRX parameter in any other state. In addition, the generating the signal may include determining a corresponding DRX parameter in accordance with a service requirement, a communication scenario or communication performance of the UE, and generating the signal indicating the DRX parameter. In this way, it is able to indicate the corresponding DRX parameter to the UE, thereby to increase the probability of acquiring data and reduce the probability of acquiring no data when blind detection is performed by the UE on a PDCCH, and reduce the power consumption for the UE.

Step 202: transmitting the signal to the UE, or transmitting the payload to the UE via a channel.

The channel may be a PDCCH signal, and the payload may be a PDCCH signal dedicated to indicate the DRX parameter. Of course, in the embodiments of the present disclosure, the payload may also be transmitted via any other channel. For example, the channel may be a wake-up channel or a go-to-sleep channel, and the signal may include a WUS or a go-to-sleep signal. The wake-up channel may be a channel through which the WUS is to be transmitted, and the go-to-sleep channel may be a channel through which the go-to-sleep signal is to be transmitted. In a possible embodiment of the present disclosure, the wake-up channel and the go-to-sleep channel may be a same channel.

Through the above steps, the DRX parameter may be indicated by the signal or the payload, so it is able to flexibly indicate the CDRX to the UE, e.g., to indicate the corresponding DRX parameter to the UE in accordance with the service requirement or the communication scenario of the UE, thereby to reduce the probability of acquiring no data when the blind detection is performed by the UE on the PDCCH, and reduce the power consumption for the UE.

In the embodiments of the present disclosure, the signal or the payload for indicating the DRX parameter may be generated, and then the signal may be transmitted to the UE or the payload may be transmitted to the UE via the channel. Because the DRX parameter is indicated by the signal or the payload, as compared with the related art where high-layer signaling is adopted, in the embodiments of the present disclosure, it is able to improve the flexibility of the DRX parameter, thereby to reduce the power consumption for the UE.

Figure 3:
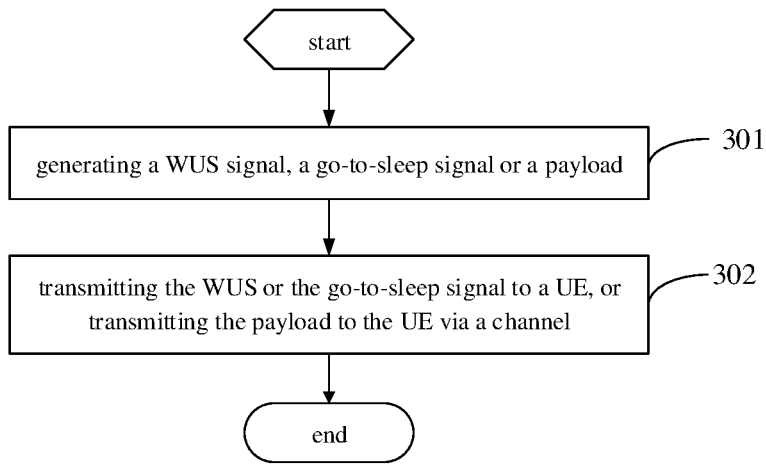
FIG. 3 is another flow chart of the DRX parameter indication method according to one embodiment of the present disclosure.

As shown in FIG. 3, the present disclosure further provides in some embodiments a DRX parameter indication method for a base station, which differs from that in FIG. 2 mainly in that the signal is a WUS signal or a go-to-sleep signal. As shown in FIG. 3, the DRX parameter indication method includes the following steps.

Step 301: generating a WUS signal, a go-to-sleep signal or a payload, the WUS signal, the go-to-sleep signal or the payload being used to indicate a DRX parameter.

In the embodiments of the present disclosure, the DRX parameter may be indicated by the WUS signal, the go-to-sleep signal or the payload to the UE, so it is unnecessary to perform any additional signal transmission, thereby to further reduce the power consumption for the UE.

Step 302: transmitting the WUS or the go-to-sleep signal to the UE, or transmitting the payload to the UE via a channel. The channel may include a wake-up channel or a go-to-sleep channel.

In a possible embodiment of the present disclosure, the DRX parameter may include a time length of an on-duration timer or a DRX cycle.

The on-duration timer may specify the quantity of continuous sub-frames within which the PDCCH needs to be monitored starting from a start sub-frame of the DRX cycle, i.e., the quantity of the sub-frames within which the PDCCH needs to be monitored continuously by the UE in an activation state. The DRX cycle may be a valid DRX cycle.

Figure 4:
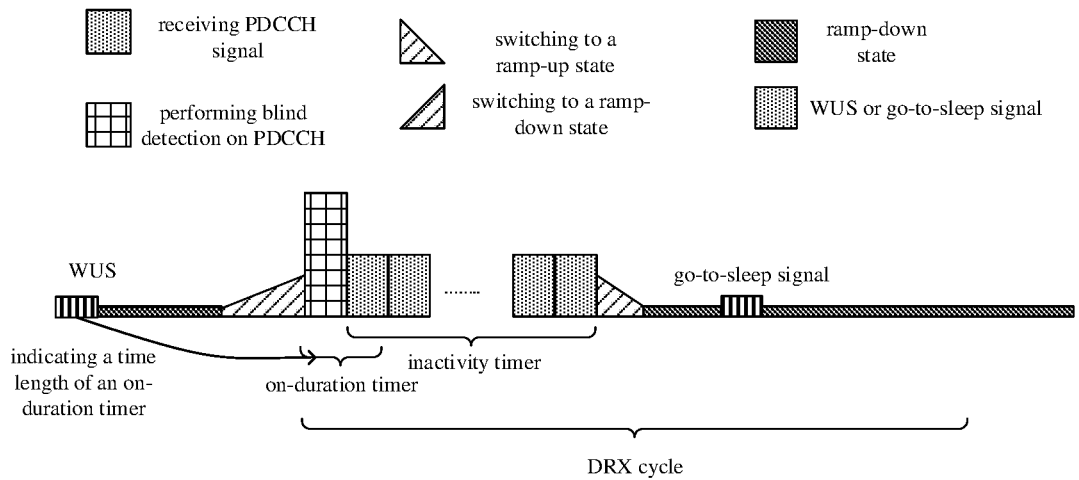
FIG. 4 is a schematic view showing a working procedure of a UE according to one embodiment of the present disclosure.

Taking the WUS as an example, the WUS may be used to indicate the UE to be woken up, and meanwhile information carried in the WUS may be used to indicate the time length of the on-duration timer, e.g., two slots, sub-frames or mini-slots, to the UE, as shown in FIG. 4. In FIG. 4, a horizontal axis represents time, and a longitudinal axis represents a working current of the UE. Upon the receipt of the WUS, the UE may be switched to a ramp-up state in response to the WUS, and perform the blind detection on the PDCCH within the time length of the on-duration timer. Here, the blind detection on the PDCCH may be understood as data & control channel processing. Then, the UE may receive the PDCCH signal within a time length of an inactivity timer. After the expiration of the inactivity timer, the UE may be switched to a ramp-down state. Of course, the UE may also receive the go-to-sleep signal subsequently, and then be maintained in a go-to-sleep state.

In the embodiments of the present disclosure, the time length of the on-duration timer or the DRX cycle may be indicated to the UE through the WUS or the go-to-sleep signal. As a result, it is able for the UE to monitor or perform the blind detection in accordance with the time length of the on-duration timer or the DRX cycle, thereby to further reduce the power consumption for the UE.

In a possible embodiment of the present disclosure, the WUS or the go-to-sleep signal may be used to indicate the DRX cycle as follows. The WUS, the go-to-sleep signal or the payload may be used to indicate the UE to perform the blind detection using a DRX cycle lower by one level than a target DRX cycle, or indicate the UE to perform the blind detection using a DRX cycle higher by one level than the target DRX cycle, or indicate the DRX cycle to be used by the UE for the blind detection. The target DRX cycle may be a DRX cycle currently used by the UE.

For example, one bit may be used to indicate the DRX cycle, where 0 represents a cycle lower by one level than the currently-used DRX cycle, and 1 represents a cycle higher by one level than the currently-used DRX cycle. Here, the level may be predefined. For example, the DRX cycle may be 160 ms, a DRX cycle higher by one level than that of 160 ms may be 320 ms, and a DRX cycle higher by one level than that of 320 ms may be 640 ms, which will not be particularly defined herein.

The indication of the DRX cycle adopted by the UE for the blind detection may refer to the indication of a specific DRX cycle adopted by the UE for the blind detection. For example, two bits may be used to indicate the DRX cycle, where 00 represents that the DRX cycle is 160 ms, 01 represents that the DRX cycle is 320 ms, 10 represents that the DRX cycle is 640 ms, and 11 represents that the DRX cycle is 1280 ms.

Figure 5:
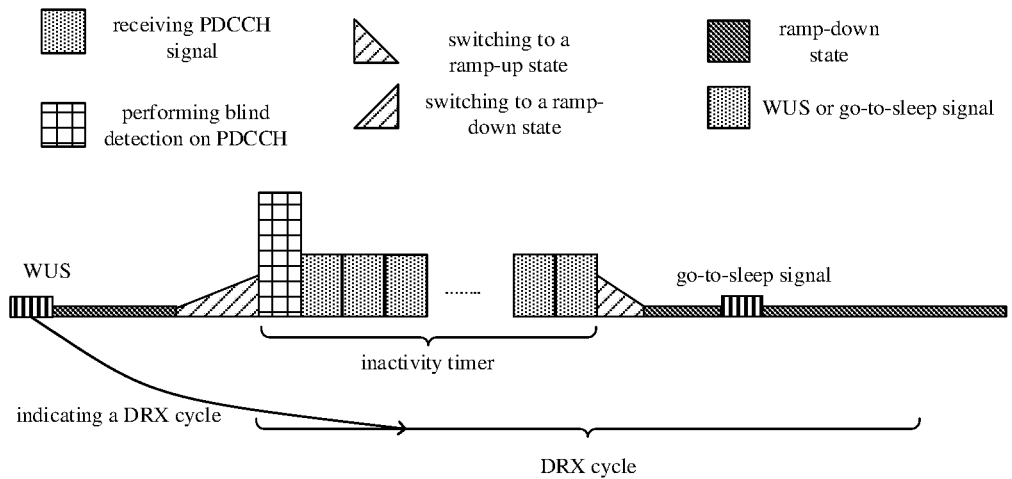
FIG. 5 is another schematic view showing the working procedure of the UE according to one embodiment of the present disclosure.

Taking the WUS as an example, the WUS may be used to indicate the UE to be woken up, and meanwhile information carried in the WUS may be used to indicate the DRX cycle of the UE. For example, one bit may be used to indicate the DRX cycle, where 0 represents a cycle lower by one level than the currently-used DRX cycle, and 1 represents a cycle higher by one level than the currently-used DRX cycle. For another example, two bits may be used to indicate the DRX cycle, where 00 represents that the DRX cycle is 160 ms, 01 represents that the DRX cycle is 320 ms, 10 represents that the DRX cycle is 640 ms, and 11 represents that the DRX cycle is 1280 ms. As shown in FIG. 5, a horizontal axis represents time, and a longitudinal axis represents a working current of the UE. Upon the receipt of the WUS, the UE may be switched to a ramp-up state in response to the WUS, and perform the blind detection on the PDCCH within the time length of the inactivity timer within the indicated DRX cycle. Here, the blind detection on the PDCCH may be understood as data & control channel processing. Then, the UE may receive the PDCCH signal within the time length of the inactivity timer. After the expiration of the inactivity timer, the UE may be switched to a ramp-down state. Of course, the UE may also receive the go-to-sleep signal subsequently, and then be maintained in the go-to-sleep state.

In the embodiments of the present disclosure, the DRX cycle of the UE may be indicated through a cycle higher or lower by one level than the target DRX cycle, so as to reduce the transmission overhead and save the transmission resources. In addition, the DRX cycle to be adopted by the UE for the blind detection may be indicated flexibly and accurately, so as to improve the blind detection performance of the UE.

In a possible embodiment of the present disclosure, the DRX parameter may include at least one of a semi-persistent scheduling cycle, a semi-persistent scheduling resource, a time length of a DRX inactivity timer, a semi-persistent detection cycle of the PDCCH, and a detection pattern of the PDCCH.

The DRX inactivity timer may be used to indicate the quantity of consecutive sub-frames maintained in an activated state after the UE has successfully decoded the PDCCH indicating the initially-transmitted uplink or downlink user data, i.e., when the initially-transmitted data is scheduled for the UE each time, the DRX inactivity timer may be restarted once.

Figure 6:
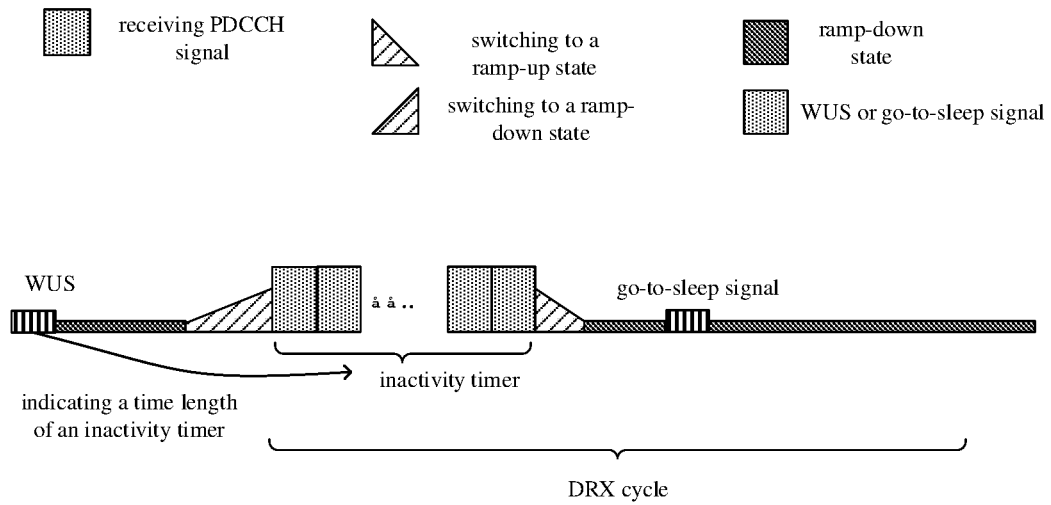
FIG. 6 is yet another schematic view showing the working procedure of the UE according to one embodiment of the present disclosure.

Taking the WUS as an example, the WUS may be used to indicate the UE to be woken up, and meanwhile information carried in the WUS may be used to indicate the time length of the DRX inactivity timer for the UE (e.g., 20 ms), or indicate the semi-persistent detection period of the PDCCH (e.g., the PDCCH may be detected every 5 ms), or indicate the semi-persistent scheduling cycle and/or resource (e.g., the semi-persistent scheduling cycle may be 10 ms, and the semi-persistent scheduling uplink or downlink resource may include physical resource blocks 4 to 9), or indicate the detection pattern of the PDCCH (e.g., the detection pattern of the PDCCH for every O1 ms may be 1111010101, where 1 represents that the PDCCH needs to be detected by the UE, and 0 represents that the PDCCH does not need to be detected by the UE). As shown in FIG. 6, a horizontal axis represents time, and a longitudinal axis represents the working current of the UE. The above DRX parameter has been indicated in the WUS (in FIG. 6, the time length of the inactivity timer is indicated), so the UE may receive the PDCCH signal within the time length of the inactivity timer, and after the expiration of the inactivity timer, the UE may be switched to a ramp-down state. Of course, the UE may also receive the go-to-sleep signal subsequently, and then be maintained in the go-to-sleep state. In this regard, it is unnecessary for the UE to perform the blind detection on the PDCCH, i.e., as compared with FIGS. 4 and 5, it is able to omit the blind detection on the PDCCH.

In the embodiments of the present disclosure, when the DRX parameter including at least one of the semi-persistent scheduling cycle, the semi-persistent scheduling resource, the time length of the DRX inactivity timer, the semi-persistent detection cycle of the PDCCH, and the detection pattern of the PDCCH is indicated in the WUS or the go-to-sleep signal, it is able to further reduce the power consumption for the UE, because it is unnecessary for the UE to perform the blind detection on the PDCCH.

It should be appreciated that, in the embodiments of the present disclosure, the DRX parameter may be suitable to a conventional slot or a mini-slot.

In a possible embodiment of the present disclosure, the DRX parameter may further include at last one of a time length of a retransmission timer, a short DRX cycle, and a time length of a short DRX timer. The short DRX cycle may be shorter than a predetermined time length.

The predetermined time length may be determined by the base station, by the UE, by a user, or in a protocol, which will not be particularly defined herein. For example, the predetermined time length may be 60 ms or 120 ms. In addition, in the embodiments of the present disclosure, except the short DRX cycle, any other DRX cycle may be defined as a long DRX cycle or a conventional DRX cycle.

In the embodiments of the present disclosure, at least one of the time length of the retransmission timer, the short DRX cycle and the time length of the short DRX timer may be indicated through the WUS or the go-to-sleep signal, so it is able for the UE to acquire the data easily during the blind detection or the monitoring, and reduce the probability of not acquiring the data during the blind detection or the monitoring procedure, thereby to further reduce the power consumption for the UE.

According to the embodiments of the present disclosure, the WUS, the go-to-sleep signal or the payload indicating the DRX parameter may be generated, and then the WUS or the go-to-sleep signal may be transmitted to the UE or the payload may be transmitted to the UE via the channel. Because the DRX parameter is indicated by the WUS or the go-to-sleep signal, as compared with the related art where high-layer signaling is adopted, in the embodiments of the present disclosure, it is able to improve the flexibility of the DRX parameter, thereby to reduce the power consumption for the UE. In addition, when the DRX parameter is indicated through the WUS or the go-to-sleep signal to the UE, it is unnecessary to perform any additional signal transmission, thereby to further reduce the power consumption for the UE.

Figure 7:
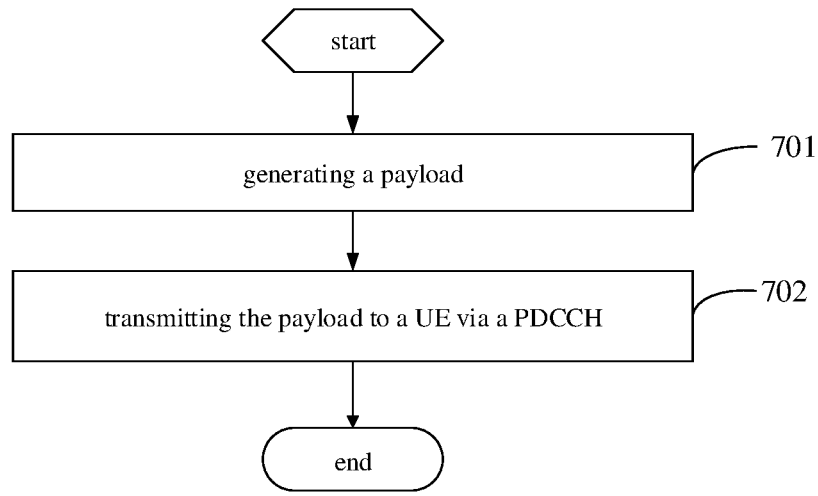
FIG. 7 is yet another flow chart of the DRX parameter indication method according to one embodiment of the present disclosure.

As shown in FIG. 7, the present disclosure further provides in some embodiments a DRX parameter indication method applied for a base station, which differs from that in FIG. 2 mainly in that the channel is a PDCCH. As shown in FIG. 7, the DRX parameter indication method may include the following steps.

Step 701: generating a payload, the payload being used to indicate a DRX parameter.

The payload may be understood as a dedicated signal for indicating the DRX parameter. In other words, in the embodiments of the present disclosure, the DRX parameter may be indicated through the payload, so as to improve the flexibility of the DRX parameter, thereby to reduce the probability of not acquiring the data during the blind detection performed by the UE on the PDCCH, and reduce the power consumption for the UE.

Step 702: transmitting the payload to the UE via the PDCCH.

In a possible embodiment of the present disclosure, the DRX parameter may include at least one of a time length of an on-duration timer, first blind detection information, and a DRX cycle. The first blind detection information may be blind detection information for the blind detection performed by the UE on the PDCCH within the time length of the on-duration timer.

The description about the on-duration timer may refer to that mentioned hereinabove with a same beneficial effect, which will not be particularly defined herein.

Figure 8:
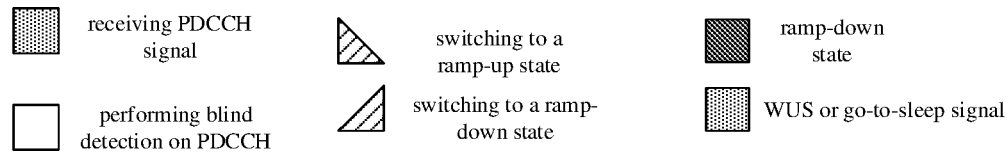
FIG. 8 is still yet another schematic view showing the working procedure of the UE according to one embodiment of the present disclosure.
Figure 8:
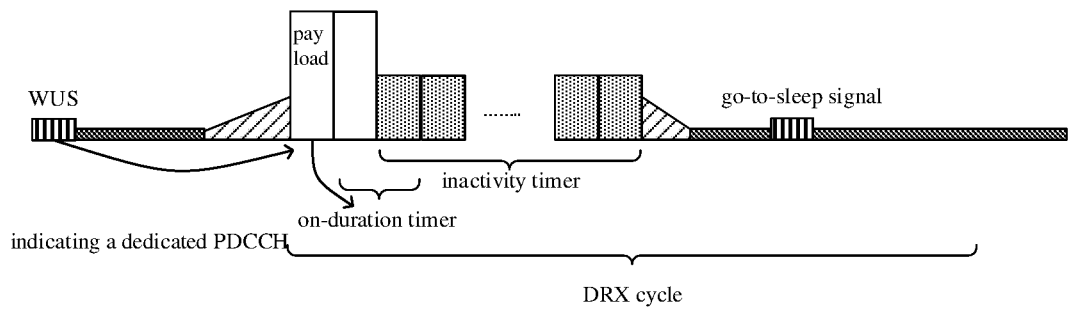

Prior to transmitting the payload (also called as a dedicated PDCCH signal), a WUS may be transmitted to the UE, so as to indicate the UE to be woken up. Then, the payload may be used to indicate the time length of the on-duration timer of the UE, e.g., two slots, sub-frames or mini-slots. In a possible embodiment of the present disclosure, the WUS may be used to indicate a blind detection parameter of the payload, e.g., indicate that bandwidth parts (BWP) occupied by the payload is bandwidth part 2. As shown in FIG. 8, a horizontal axis represents time, and a longitudinal axis represents a working current of the UE. Upon the receipt of the WUS, the UE may be switched to a ramp-up state in response to the WUS, and perform the blind detection on the payload in accordance with the WUS. Next, the UE may perform blind detection on the PDCCH within the time length of the on-duration timer in accordance with the DRX parameter indicated in the payload. Here, the blind detection on the PDCCH may be understood as data & control channel processing. Then, the UE may receive the PDCCH signal within a time length of an inactivity timer. After the expiration of the inactivity timer, the UE may be switched to a ramp-down state. Of course, the UE may also receive the go-to-sleep signal subsequently, and then be maintained in a go-to-sleep state.

It should be appreciated that, in the embodiments of the present disclosure, prior to transmitting the payload, the WUS may not be transmitted, e.g., the payload may also be used to wake up the UE.

In the embodiments of the present disclosure, at least one of the time length of the on-duration timer, the first blind detection information and the DRX cycle may be indicated to the UE through the payload, so it is able for the UE to perform the corresponding monitoring or blind detection operation in accordance with at least one of the time length of the on-duration timer, the first blind detection information and the DRX cycle, thereby to further reduce the power consumption for the UE.

In a possible embodiment of the present disclosure, the first blind detection information may include at least one of a time interval between a start time of the on-duration timer and the payload, an aggregation level of the PDCCH, a type of a search space of the PDCCH, a Downlink Control Information (DCI) format to be transmitted via the PDCCH, bandwidth parts occupied by the PDCCH, and a time-frequency-domain resource occupied by the PDCCH.

The aggregation level of the PDCCH may include 1, 2, 4 or 8 Control Channel Elements (CCEs), which will not be particularly defined herein.

The search space of the PDCCH may be a common search space and/or a UE-specific search space, which will not be particularly defined herein.

The DCI format may be a format 1 or a format 3, or both, which will not be particularly defined herein.

The time-frequency-domain resource occupied by the PDCCH may be an Orthogonal Frequency Division Multiplexing (OFDM) symbol index occupied by the PDCCH, or any other information about the time-frequency-domain resource, which will not be particularly defined herein.

In the embodiments of the present disclosure, through the first blind detection information, it is able to further reduce the probability of not acquiring the data during the blind detection performed by the UE on the PDCCH within the time length of the on-duration timer, i.e., increase the success rate of the blind detection on the PDCCH, thereby to further reduce the power consumption for the UE.

In a possible embodiment of the present disclosure, the payload may be used to indicate the DRX cycle as follows. The payload may be used to indicate the UE to perform the blind detection using a DRX cycle lower by one level than a target DRX cycle, or indicate the UE to perform the blind detection using a DRX cycle higher by one level than the target DRX cycle, or indicate a DRX cycle to be used by the UE for the blind detection. The target DRX cycle may be a DRX cycle currently used by the UE.

For example, one bit may be used to indicate the DRX cycle, where 0 represents a cycle lower by one level than the currently-used DRX cycle, and 1 represents a cycle higher by one level than the currently-used DRX cycle. Here, the level may be predefined. For example, the DRX cycle may be 160 ms, a DRX cycle higher by one level than that of 160 ms may be 320 ms, and a DRX cycle higher by one level than that of 320 ms may be 640 ms, which will not be particularly defined herein.

The indication of the DRX cycle adopted by the UE for the blind detection may refer to the indication of a specific DRX cycle adopted by the UE for the blind detection. For example, two bits may be used to indicate the DRX cycle, where 00 represents that the DRX cycle is 160 ms, 01 represents that the DRX cycle is 320 ms, 10 represents that the DRX cycle is 640 ms, and 11 represents that the DRX cycle is 1280 ms.

Figure 9:
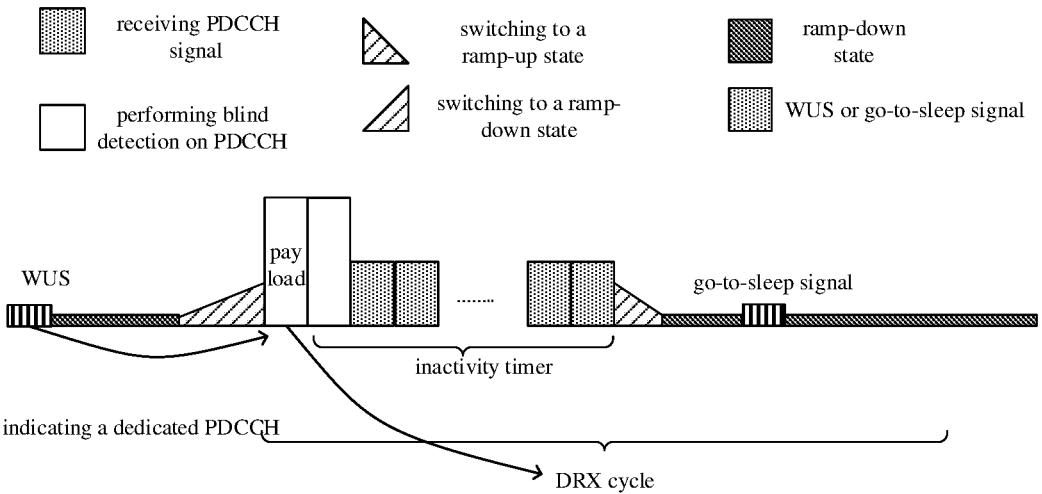
FIG. 9 is still yet another schematic view showing the working procedure of the UE according to one embodiment of the present disclosure.

Prior to transmitting the payload, the WUS may also be transmitted to the UE, so as to indicate the UE to be woken up. Then, the DRX cycle of the UE may be indicated through the payload, e.g., through one bit (where 0 represents a cycle lower by one level than the currently-used DRX cycle, and 1 represents a cycle higher by one level than the currently-used DRX cycle), or through two bits (where 00 represents that the DRX cycle is 160 ms, 01 represents that the DRX cycle is 320 ms, 10 represents that the DRX cycle is 640 ms, and 11 represents that the DRX cycle is 1280 ms). In a possible embodiment of the present disclosure, the WUS may be used to indicate the blind detection parameter of the payload, e.g., indicate that the bandwidth parts occupied by the payload is bandwidth parts 2. As shown in FIG. 9, a horizontal axis represents time, and a longitudinal axis represents a working current of the UE. Upon the receipt of the WUS, the UE may be switched to the ramp-up state in response to the WUS, and perform the blind detection on the payload in accordance with the WUS. The, the UE may, within the DRX cycle indicated through the payload, perform the blind detection on the PDCCH within the time length of the inactivity timer. Here, the blind detection on the PDCCH may be understood as data & control channel processing. Then, the UE may receive the PDCCH signal within the time length of the inactivity timer. After the expiration of the inactivity timer, the UE may be switched to the ramp-down state. Of course, the UE may also receive the go-to-sleep signal subsequently, and then be maintained in the go-to-sleep state.

In the embodiments of the present disclosure, the DRX cycle of the UE higher or lower by one level than the target DRX cycle may be indicated through the payload, so as to reduce the transmission overhead and save the transmission resources. In addition, the DRX cycle to be adopted by the UE for the blind detection may be indicated flexibly and accurately, so as to improve the blind detection performance of the UE.

In a possible embodiment of the present disclosure, the DRX parameter may include at least one of a semi-persistent scheduling cycle, a semi-persistent scheduling resource, a time length of a DRX inactivity timer, a semi-persistent detection cycle of the PDCCH, a detection pattern of the PDCCH, and second blind detection information. The second blind detection information may be the blind detection information used by the UE for the blind detection on the PDCCH within the time length of the DRX inactivity timer.

The description about the DRX inactivity timer may refer to that mentioned hereinabove with a same beneficial effect, and thus will not be particularly defined herein.

Figure 10:
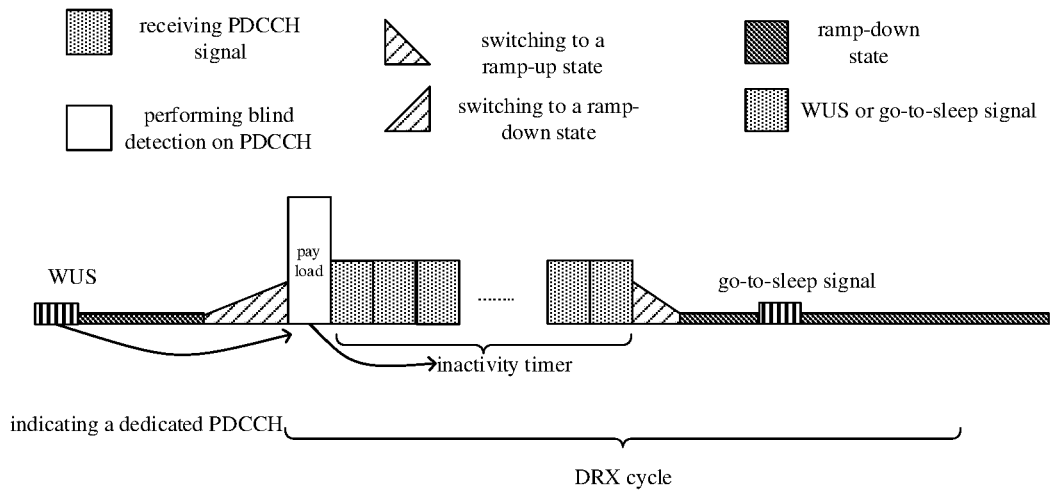
FIG. 10 is still yet another schematic view showing the working procedure of the UE according to one embodiment of the present disclosure.

Prior to transmitting the payload, the WUS may also be transmitted to the UE, so as to indicate the UE to be woken up. Then, the payload may be used to indicate the time length of the DRX inactivity timer (e.g., 20 ms), or the semi-persistent detection cycle of the PDCCH (e.g., the PDCCH may be detected every 5 ms), or the semi-persistent scheduling cycle and/or resource (e.g., the semi-persistent scheduling cycle may be 10 ms, and the semi-persistent scheduling uplink or downlink resource may include physical resource blocks 4 to 9), or the detection pattern of the PDCCH (e.g., the detection pattern of the PDCCH for every 10 ms may be 1111010101, where 1 represents that the PDCCH needs to be detected by the UE, and 0 represents that the PDCCH does not need to be detected by the UE). In a possible embodiment of the present disclosure, the WUS may be used to indicate a blind detection parameter of the payload, e.g., indicate that bandwidth parts occupied by the PDCCH signal is bandwidth parts 3. As shown in FIG. 10, a horizontal axis represents time, and a longitudinal axis represents the working current of the UE. The above DRX parameter has been indicated in the payload, so the UE may receive the PDCCH signal within the time length of the inactivity timer, and after the expiration of the inactivity timer, the UE may be switched to a ramp-down state. Of course, the UE may also receive the go-to-sleep signal subsequently, and then be maintained in the go-to-sleep state. In this regard, it is unnecessary for the UE to perform the blind detection on the PDCCH, i.e., as compared with FIGS. 8 and 9, it is able to omit the blind detection on the PDCCH.

In the embodiments of the present disclosure, when the DRX parameter including at least one of the semi-persistent scheduling cycle, the semi-persistent scheduling resource, the time length of the DRX inactivity timer, the semi-persistent detection cycle of the PDCCH, the detection pattern of the PDCCH and the second blind detection information is indicated in the payload, it is able to further reduce the power consumption for the UE, because it is unnecessary for the UE to perform the blind detection on the PDCCH.

In a possible embodiment of the present disclosure, the second blind detection information may include at least one of a time interval between a start time of the DRX inactivity timer and the payload, an aggregation level of the PDCCH, a type of a search space of the PDCCH, a DCI format to be transmitted via the PDCCH, bandwidth parts occupied by the PDCCH, and a time-frequency-domain resource occupied by the PDCCH.

The description about the second blind detection information may refer to that mentioned hereinabove, and thus will not be particularly defined herein.

In the embodiments of the present disclosure, through the second blind detection information, it is able to further reduce the probability of not acquiring any data during the blind detection performed by the UE on the PDCCH within the time length of the DRX inactivity timer, i.e., improve the success rate of the blind detection on the PDCCH, thereby to further reduce the power consumption for the UE.

In a possible embodiment of the present disclosure, prior to transmitting the signal to the UE, the DRX parameter indication method may further include transmitting the WUS to the UE, and the WUS may be used to indicate the UE to detect the payload. The description about the WUS may refer to that in FIGS. 8 to 10.

In the embodiments of the present disclosure, the WUS may be transmitted to the UE prior to the transmission of the payload, so as to indicate the UE to detect the payload in time, thereby to improve the performance of the UE.

In a possible embodiment of the present disclosure, the WUS may be further used to indicate the blind detection information about the payload.

In the embodiments of the present disclosure, the WUS may be transmitted to the UE prior to the transmission of the payload, so as to indicate the blind detection information about the payload, and enable the UE to acquire the payload efficiently, thereby to further reduce the power consumption for the UE.

In a possible embodiment of the present disclosure, the blind detection information about the payload may include at least one of a time interval between the payload and the WUS, a time interval between the payload and the go-to-sleep signal, an aggregation level of the payload, a type of a search space of the payload, a DCI format to be transmitted via the payload, and bandwidth parts occupied by the payload.

The aggregation level of the payload may include 1, 2, 4 or 8 CCEs, which will not be particularly defined herein.

The search space of the payload may be a common search space and/or a UE-specific search space, which will not be particularly defined herein.

The DCI format may be a format 1 or a format 3, or both, which will not be particularly defined herein.

The time-frequency-domain resource occupied by the PDCCH may be an Orthogonal Frequency Division Multiplexing (OFDM) symbol index occupied by the PDCCH, or any other information about the time-frequency-domain resource, which will not be particularly defined herein.

In the embodiments of the present disclosure, through the blind detection information about the payload, it is able to further improve the success rate of the blind detection performed by the UE on the payload, thereby to further reduce the power consumption for the UE.

In a possible embodiment of the present disclosure, the time interval between the payload and the WUS may be pre-configured, or the time interval between the payload and the go-to-sleep signal may be pre-configured.

The time interval may be preconfigured in a protocol, or preconfigured through negotiation between the base station and the UE, which will not be particularly defined herein.

In the embodiments of the present disclosure, the time interval between the payload and the WUS or between the payload and the go-to-sleep signal may be preconfigured, so as to reduce the transmission overhead as well as the transmission resource.

According to the embodiments of the present disclosure, the payload for indicating the DRX parameter may be generated, and then transmitted to the UE via the PDCCH. Because the DRX parameter is indicated through the payload, it is able to improve the flexibility of the DRX parameter, and reduce the probability of not acquiring any data during the blind detection performed by the UE on the PDCCH, thereby to reduce the power consumption for the UE.

Figure 11:
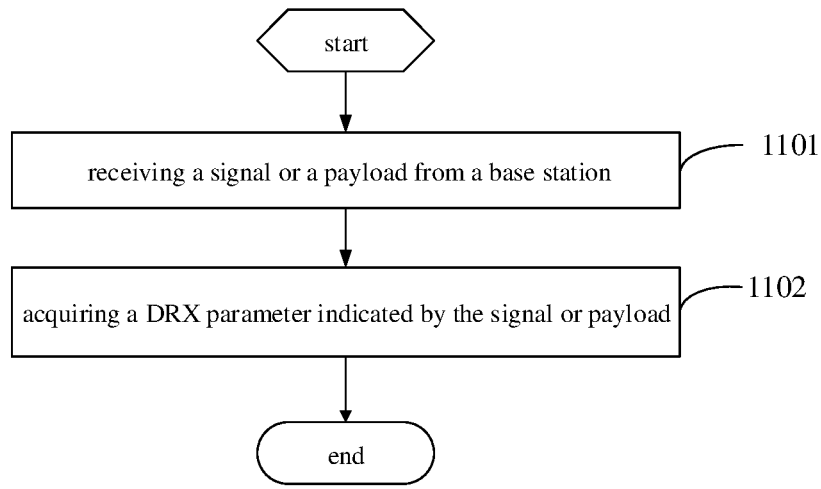
FIG. 11 is a flow chart of a DRX parameter indication method according to one embodiment of the present disclosure.

The present disclosure further provides in some embodiments a DRX parameter indication method for a UE which, as shown in FIG. 11, includes the following steps.

Step 1101: receiving a signal or a payload from a base station, the signal or payload being used to indicate a DRX parameter. The description about the signal or payload may refer to that mentioned in FIGS. 2 and 3 with a same beneficial effect, and thus will not be particularly defined herein.

Step 1102: acquiring the DRX parameter indicated by the signal or payload. The payload may be transmitted via a channel.

The acquiring the DRX parameter indicated by the signal or payload may include: determining the DRX parameter indicated by the signal or the payload in accordance with a pre-acquired correspondence between the signal or payload and the DRX parameter; or determining the DRX parameter indicated through indication information included in the signal or payload in accordance with a pre-acquired correspondence between the indication information and the DRX parameter; or identifying an indication content included in the signal or payload and identifying the DRX parameter indicated in the indication content, which will not be particularly defined herein.

In a possible embodiment of the present disclosure, the signal may include a WUS or a go-to-sleep signal, and the channel may include a wake-up channel or a go-to-sleep channel.

The description about the WUS or the go-to-sleep signal may refer to that in FIG. 3 with a same beneficial effect, and thus will not be particularly defined herein.

In a possible embodiment of the present disclosure, the DRX parameter may include a time length of an on-duration timer or a DRX cycle.

The description about the time length of the on-duration timer or the DRX cycle may refer to that in FIG. 3 with a same beneficial effect, and thus will not be particularly defined herein.

In a possible embodiment of the present disclosure, the DRX parameter may include at least one of a semi-persistent scheduling cycle, a semi-persistent scheduling resource, a time length of a DRX inactivity timer, a semi-persistent detection cycle of a PDCCH, and a detection pattern of the PDCCH.

The description about the DRX parameter may refer to that in FIG. 3 with a same beneficial effect, and thus will not be particularly defined herein.

In a possible embodiment of the present disclosure, the WUS or the go-to-sleep signal or the payload may be used to indicate the UE to perform the blind detection using a DRX cycle lower by one level than a target DRX cycle, or indicate the UE to perform the blind detection using a DRX cycle higher by one level than the target DRX cycle, or indicate a DRX cycle to be used by the UE for the blind detection. The target DRX cycle may be a DRX cycle currently used by the UE.

The description about the WUS or the go-to-sleep signal may refer to that in FIG. 3 with a same beneficial effect, and thus will not be particularly defined herein.

In a possible embodiment of the present disclosure, the DRX parameter may further include at least one of a time length of a retransmission timer, a short DRX cycle, and a time length of a short DRX timer. The short DRX cycle may be shorter than a predetermined time length.

The description about the DRX parameter may refer to that in FIG. 3 with a same beneficial effect, and thus will not be particularly defined herein.

In a possible embodiment of the present disclosure, the channel may include the PDCCH.

The description about the channel may refer to that in FIG. 7 with a same beneficial effect, and thus will not be particularly defined herein.

In a possible embodiment of the present disclosure, the DRX parameter may include at least one of the time length of the on-duration timer, first blind detection information and the DRX cycle. The first blind detection information may be blind detection information for the blind detection performed by the UE on the PDCCH within the time length of the on-duration timer.

The description about the time length of the on-duration timer, the first blind detection information and the DRX cycle may refer to that in FIG. 7 with a same beneficial effect, and thus will not be particularly defined herein.

In a possible embodiment of the present disclosure, the DRX parameter may include at least one of the semi-persistent scheduling cycle, the semi-persistent scheduling resource, the time length of the DRX inactivity timer, the semi-persistent detection cycle of the PDCCH, the detection pattern of the PDCCH and second blind detection information. The second blind detection information may be blind detection information used by the UE for the blind detection on the PDCCH within the time length of the DRX inactivity timer.

The description about the DRX parameter may refer to that in FIG. 7 with a same beneficial effect, and thus will not be particularly defined herein.

In a possible embodiment of the present disclosure, subsequent to acquiring the DRX parameter indicated by the signal or the payload, the DRX parameter indication method may further include performing blind detection on the PDCCH in accordance with the DRX parameter after the UE has been woken up.

In the embodiments of the present disclosure, when the time length of the on-duration timer or the DRX cycle is indicated through the WUS or the go-to-sleep signal or at least one of the time length of the on-duration timer, the first blind detection information and the DRX cycle is indicated through the payload, it is able for the UE to perform the blind detection on the PDCCH in accordance with the DRX parameter, thereby to increase the success rate of the blind detection on the PDCCH, and reduce the power consumption for the UE, as shown in FIGS. 4, 5, 8 and 9.

In a possible embodiment of the present disclosure, subsequent to acquiring the DRX parameter indicated by the signal or the payload, the DRX parameter indication method may further include receiving a PDCCH signal in accordance with the DRX parameter after the UE has been woken up.

In the embodiments of the present disclosure, when at least one of a non-persistent scheduling cycle, a non-persistent scheduling resource, the time length of the DRX inactivity timer, a non-persistent detection cycle of the PDCCH and the detection pattern of the PDCCH is indicated through the WUS or the go-to-sleep signal, or at least one of the non-persistent scheduling cycle, the non-persistent scheduling resource, the time length of the DRX inactivity timer, the non-persistent detection cycle of the PDCCH, the detection pattern of the PDCCH and the second blind detection information is indicated through the payload, the PDCCH signal may be received directly in accordance with the DRX parameter indicated through the WUS or the payload. After the UE has been woken up and before the PDCCH signal has been received, it is able to reduce the times of the blind detection operations on the PDCCH, thereby to further reduce the power consumption for the UE, as shown in FIGS. 6 and 10.

In addition, when the UE does not perform the blind detection on the PDCCH after the UE has been woken up and before the PDCCH signal has been received in accordance with the DRX parameter, the UE may not perform data & control channel processing after the UE has been woken up and before the PDCCH signal has been received in accordance with the DRX parameter.

In a possible embodiment of the present disclosure, the payload may be used to indicate the UE to perform the blind detection using a DRX cycle lower by one level than a target DRX cycle, or indicate the UE to perform the blind detection using a DRX cycle higher by one level than the target DRX cycle, or indicate a DRX cycle to be used by the UE for the blind detection. The target DRX cycle may be a DRX cycle currently used by the UE.

The description about the payload may refer to that in FIG. 7 with a same beneficial effect, and thus will not be particularly defined herein.

In a possible embodiment of the present disclosure, the first blind detection information may include at least one of a time interval between a start time of the on-duration timer and the payload, an aggregation level of the PDCCH, a type of a search space of the PDCCH, a DCI format to be transmitted via the PDCCH, bandwidth parts occupied by the PDCCH, and a time-frequency-domain resource occupied by the PDCCH.

The description about the first blind detection information may refer to that in FIG. 7 with a same beneficial effect, and thus will not be particularly defined herein.

In a possible embodiment of the present disclosure, the second blind detection information may include at least one of a time interval between a start time of the DRX inactivity timer and the payload, the aggregation level of the PDCCH, the type of the search space of the PDCCH, the DCI format to be transmitted via the PDCCH, the bandwidth parts occupied by the PDCCH, and the time-frequency-domain resource occupied by the PDCCH.

The description about the second blind detection information may refer to that in FIG. 7 with a same beneficial effect, and thus will not be particularly defined herein.

In a possible embodiment of the present disclosure, prior to receiving the signal or the payload from the base station, the DRX parameter indication method may further include receiving a WUS from the base station. The receiving the payload from the base station may include responding to the WUS, and performing the blind detection on the payload in accordance with the WUS. The WUS may be used to indicate the UE to detect the payload.

The description about the WUS may refer to that in FIG. 7 with a same beneficial effect, and thus will not be particularly defined herein.

In a possible embodiment of the present disclosure, the responding to the WUS and performing the blind detection on the payload in accordance with the WUS may include responding to the WUS, and performing the blind detection on the payload in accordance with blind detection information about the payload indicated through the WUS. The WUS may also be used to indicate the blind detection information about the payload.

The description about the WUS may refer to that in FIG. 7 with a same beneficial effect, and thus will not be particularly defined herein.

In a possible embodiment of the present disclosure, the blind detection information about the payload may include at least one of a time interval between the payload and the WUS, a time interval between the payload and the go-to-sleep signal, an aggregation level of the payload, a type of a search space of the payload, a DCI format to be transmitted via the payload, and bandwidth parts occupied by the payload.

The description about the blind detection information of the payload may refer to that in FIG. 7 with a same beneficial effect, and thus will not be particularly defined herein.

In a possible embodiment of the present disclosure, the time interval between the payload and the WUS may be pre-configured, or the time interval between the payload and the WUS may be pre-configured.

The description about the time intervals may refer to that in FIG. 7 with a same beneficial effect, and thus will not be particularly defined herein.

According to the embodiments of the present disclosure, the signal or the payload for indicating the DRX parameter may be received from the base station, and then the DRX parameter indicated by the signal or the payload may be acquired. The payload may be transmitted via the channel. Because the DRX parameter is indicated by the signal or the payload, as compared with the related art where high-layer signaling is adopted, in the embodiments of the present disclosure, it is able to improve the flexibility of the DRX parameter, thereby to reduce the power consumption for the UE.

Figure 12:
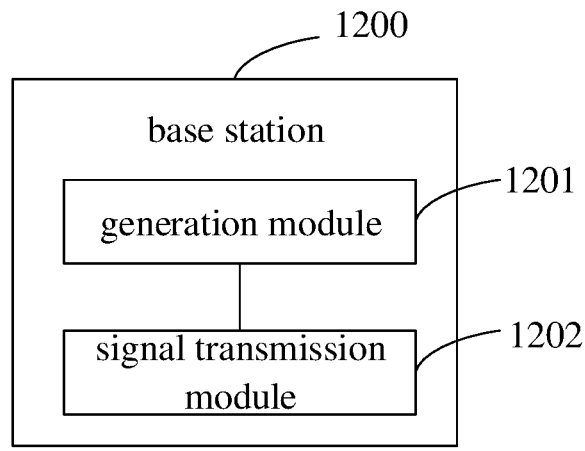
FIG. 12 is a schematic view showing a base station according to one embodiment of the present disclosure.

The present disclosure further provides in some embodiments a base station capable of implementing the DRX parameter indication method in FIGS. 2 to 7 with a same technical effect. As shown in FIG. 12, the base station 1200 may include a generation module 1201 and a signal transmission module 1202. The generation module 1201 may be connected to the signal transmission module 1202. The generation module 1201 is configured to generate a signal or a payload, and the signal or payload may be used to indicate a DRX parameter. The signal transmission module 1202 is configured to transmit the signal to a UE, or transmit the payload to the UE via a channel.

In a possible embodiment of the present disclosure, the signal may include a WUS or a go-to-sleep signal, and the channel may include a wake-up channel or a go-to-sleep channel.

In a possible embodiment of the present disclosure, the DRX parameter may include a time length of an on-duration timer or a DRX cycle.

In a possible embodiment of the present disclosure, the DRX parameter may include at least one of a semi-persistent scheduling cycle, a semi-persistent scheduling resource, a time length of a DRX inactivity timer, a semi-persistent detection cycle of a PDCCH, and a detection pattern of the PDCCH.

In a possible embodiment of the present disclosure, the WUS, the go-to-sleep signal or the payload may be used to indicate the UE to perform the blind detection using a DRX cycle lower by one level than a target DRX cycle, or indicate the UE to perform the blind detection using a DRX cycle higher by one level than the target DRX cycle, or indicate a DRX cycle to be used by the UE for the blind detection. The target DRX cycle may be a DRX cycle currently used by the UE.

In a possible embodiment of the present disclosure, the DRX parameter may further include at least one of a time length of a retransmission timer, a short DRX cycle, and a time length of a short DRX timer. The short DRX cycle may be shorter than a predetermined time length.

In a possible embodiment of the present disclosure, the channel may include the PDCCH.

In a possible embodiment of the present disclosure, the DRX parameter may include at least one of a time length of an on-duration timer, first blind detection information and a DRX cycle. The first blind detection information may be blind detection information for the blind detection performed by the UE on the PDCCH within the time length of the on-duration timer.

In a possible embodiment of the present disclosure, the DRX parameter may include at least one of a semi-persistent scheduling cycle, a semi-persistent scheduling resource, a time length of a DRX inactivity timer, a semi-persistent detection cycle of the PDCCH, a detection pattern of the PDCCH, and second blind detection information. The second blind detection information may be blind detection information used by the UE for the blind detection on the PDCCH within the time length of the DRX inactivity timer.

In a possible embodiment of the present disclosure, the payload may be used to indicate the UE to perform the blind detection using a DRX cycle lower by one level than a target DRX cycle, or indicate the UE to perform the blind detection using a DRX cycle higher by one level than the target DRX cycle, or indicate a DRX cycle to be used by the UE for the blind detection. The target DRX cycle may be a DRX cycle currently used by the UE.

In a possible embodiment of the present disclosure, the first blind detection information may include at least one of a time interval between a start time of the on-duration timer and the payload, an aggregation level of the PDCCH, a type of a search space of the PDCCH, a DCI format to be transmitted via the PDCCH, bandwidth parts occupied by the PDCCH, and a time-frequency-domain resource occupied by the PDCCH.

In a possible embodiment of the present disclosure, the second blind detection information may include at least one of a time interval between a start time of the DRX inactivity timer and the payload, the aggregation level of the PDCCH, the type of the search space of the PDCCH, the DCI format to be transmitted via the PDCCH, the bandwidth parts occupied by the PDCCH, and the time-frequency-domain resource occupied by the PDCCH.

Figure 13:
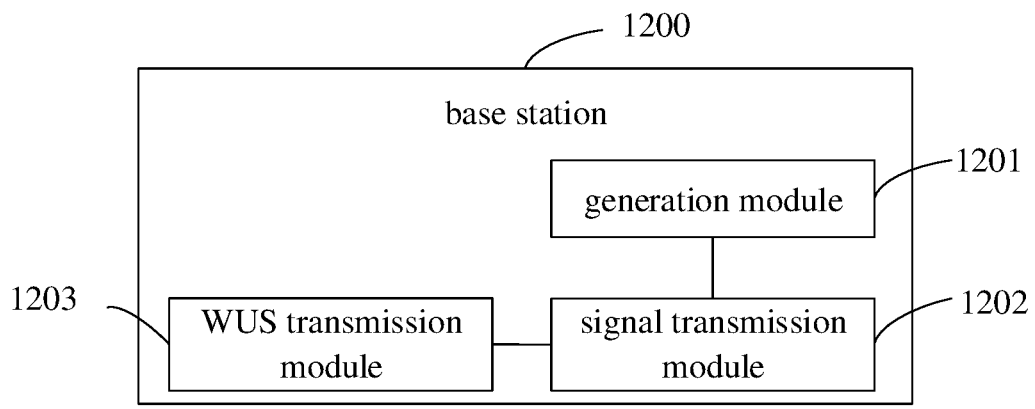
FIG. 13 is another schematic view showing the base station according to one embodiment of the present disclosure.

In a possible embodiment of the present disclosure, as shown in FIG. 13, the base station 1200 may further include a WUS transmission module 1203 configured to transmit the WUS to the UE. The WUS may be used to indicate the UE to detect the payload.

In a possible embodiment of the present disclosure, the WUS may also be used to indicate blind detection information about the payload.

In a possible embodiment of the present disclosure, the blind detection information about the payload may include at least one of a time interval between the payload and the WUS, a time interval between the payload and the go-to-sleep signal, an aggregation level of the payload, a type of a search space of the payload, a DCI format to be transmitted via the payload, and bandwidth parts occupied by the payload.

In a possible embodiment of the present disclosure, the time interval between the payload and the WUS may be pre-configured, or the time interval between the payload and the go-to-sleep signal may be pre-configured.

According to the embodiments of the present disclosure, the signal or the payload for indicating the DRX parameter may be generated, and then the signal may be transmitted to the UE or the payload may be transmitted to the UE via the channel. Because the DRX parameter is indicated by the signal or the payload, as compared with the related art where high-layer signaling is adopted, in the embodiments of the present disclosure, it is able to improve the flexibility of the DRX parameter, thereby to reduce the power consumption for the UE.

Figure 14:
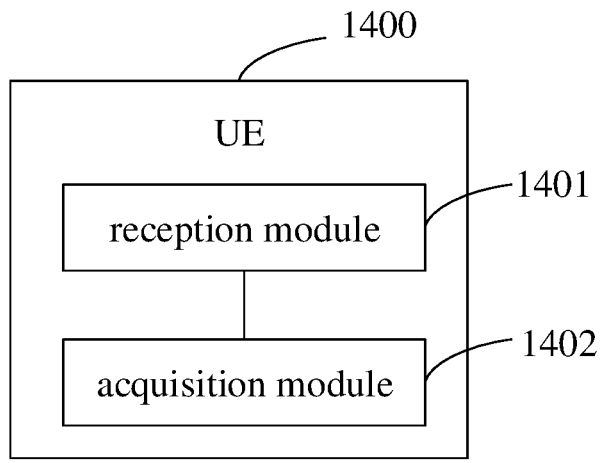
FIG. 14 is a schematic view showing the UE according to one embodiment of the present disclosure.

The present disclosure further provides in some embodiments a UE capable of implementing the DRX parameter indication method in FIG. 11 with a same technical effect. As shown in FIG. 14, the UE 1400 may include a reception module 1401 and an acquisition module 1402. The reception module 1401 may be connected to the acquisition module 1402. The reception module 1401 is configured to receive a signal or a payload from a base station, and the signal or the payload may be used to indicate a DRX parameter. The acquisition module 1402 is configured to acquire the DRX parameter indicated by the signal or the payload. The payload may be transmitted via a channel.

In a possible embodiment of the present disclosure, the signal may include a WUS or a go-to-sleep signal, and the channel may include a wake-up channel or a go-to-sleep channel.

In a possible embodiment of the present disclosure, the DRX parameter may include a time length of an on-duration timer or a DRX cycle.

In a possible embodiment of the present disclosure, the DRX parameter may include at least one of a semi-persistent scheduling cycle, a semi-persistent scheduling resource, a time length of a DRX inactivity timer, a semi-persistent detection cycle of a PDCCH, and a detection pattern of the PDCCH.

In a possible embodiment of the present disclosure, the WUS, the go-to-sleep signal or the payload may be used to indicate the UE to perform the blind detection using a DRX cycle lower by one level than a target DRX cycle, or indicate the UE to perform the blind detection using a DRX cycle higher by one level than the target DRX cycle, or indicate a DRX cycle to be used by the UE for the blind detection. The target DRX cycle may be a DRX cycle currently used by the UE.

In a possible embodiment of the present disclosure, the DRX parameter may further include at least one of a time length of a retransmission timer, a short DRX cycle, and a time length of a short DRX timer. The short DRX cycle may be shorter than a predetermined time length.

In a possible embodiment of the present disclosure, the channel may include the PDCCH.

In a possible embodiment of the present disclosure, the DRX parameter may include at least one of a time length of an on-duration timer, first blind detection information and a DRX cycle. The first blind detection information may be blind detection information for the blind detection performed by the UE on the PDCCH within the time length of the on-duration timer.

In a possible embodiment of the present disclosure, the DRX parameter may include at least one of a semi-persistent scheduling cycle, a semi-persistent scheduling resource, a time length of a DRX inactivity timer, a semi-persistent detection cycle of the PDCCH, a detection pattern of the PDCCH, and second blind detection information. The second blind detection information may be blind detection information used by the UE for the blind detection on the PDCCH within the time length of the DRX inactivity timer.

Figure 15:
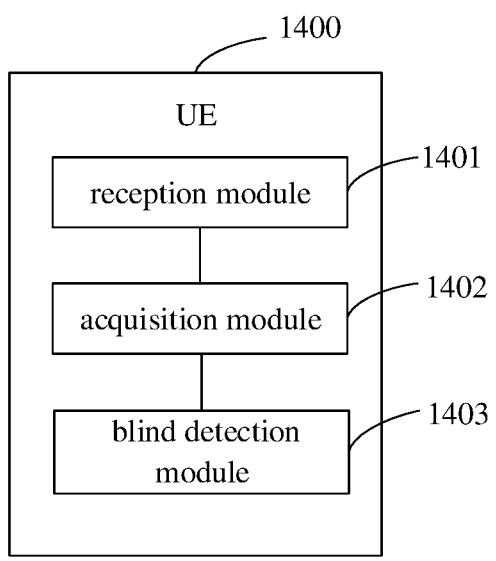
FIG. 15 is another schematic view showing the UE according to one embodiment of the present disclosure.

In a possible embodiment of the present disclosure, as shown in FIG. 15, the UE 1400 may further include a blind detection module 1403 configured to perform blind detection on the PDCCH in accordance with the DRX parameter after the UE has been woken up.

Figure 16:
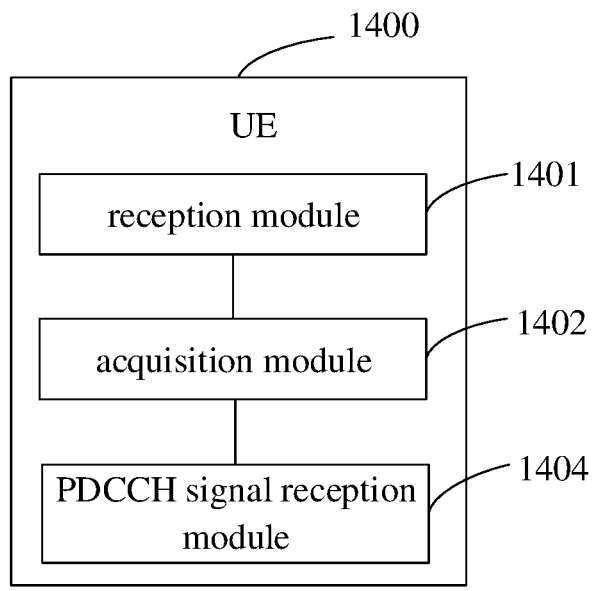
FIG. 16 is yet another schematic view showing the UE according to one embodiment of the present disclosure.

In a possible embodiment of the present disclosure, as shown in FIG. 16, the UE 1400 may further include a PDCCH signal reception module 1404 configured to receive a PDCCH signal in accordance with the DRX parameter after the UE has been woken up.

In a possible embodiment of the present disclosure, the payload may be used to indicate the UE to perform the blind detection using a DRX cycle lower by one level than a target DRX cycle, or indicate the UE to perform the blind detection using a DRX cycle higher by one level than the target DRX cycle, or indicate a DRX cycle to be used by the UE for the blind detection. The target DRX cycle may be a DRX cycle currently used by the UE.

In a possible embodiment of the present disclosure, the first blind detection information may include at least one of a time interval between a start time of the on-duration timer and the payload, an aggregation level of the PDCCH, a type of a search space of the PDCCH, a DCI format to be transmitted via the PDCCH, bandwidth parts occupied by the PDCCH, and a time-frequency-domain resource occupied by the PDCCH.

In a possible embodiment of the present disclosure, the second blind detection information may include at least one of a time interval between a start time of the DRX inactivity timer and the payload, the aggregation level of the PDCCH, the type of the search space of the PDCCH, the DCI format to be transmitted via the PDCCH, the bandwidth parts occupied by the PDCCH, and the time-frequency-domain resource occupied by the PDCCH.

Figure 17:
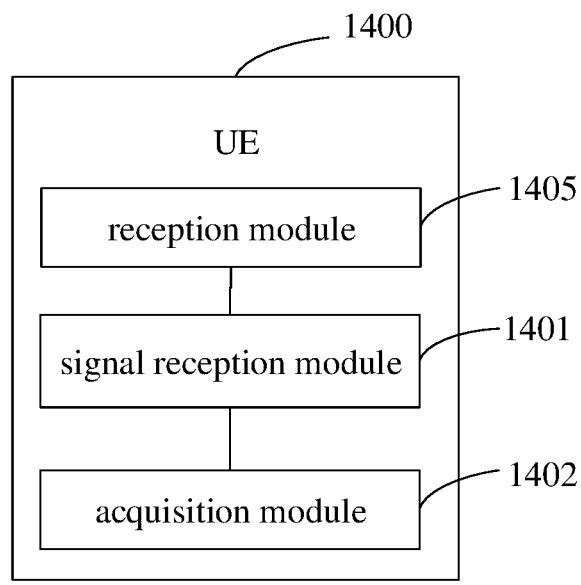
FIG. 17 is still yet another schematic view showing the UE according to one embodiment of the present disclosure.

In a possible embodiment of the present disclosure, as shown in FIG. 17, the UE 1400 may further include a WUS reception module 1405 configured to receive a WUS from the base station. The reception module 1401 is further configured to respond to the WUS, and perform blind detection on the payload in accordance with the WUS. The WUS may be used to indicate the UE to detect the payload.

In a possible embodiment of the present disclosure, the reception module 1401 is further configured to respond to the WUS, and perform blind detection on the payload in accordance with blind detection information about the payload indicated by the WUS. The WUS may be further used to indicate the blind detection information about the payload.

In a possible embodiment of the present disclosure, the blind detection information about the payload may include at least one of a time interval between the payload and the WUS, a time interval between the payload and the go-to-sleep signal, an aggregation level of the payload, a type of a search space of the payload, a DCI format to be transmitted via the payload, and bandwidth parts occupied by the payload.

In a possible embodiment of the present disclosure, the time interval between the payload and the WUS may be pre-configured, or the time interval between the payload and the go-to-sleep signal may be pre-configured.

According to the embodiments of the present disclosure, the signal or the payload for indicating the DRX parameter may be received from the base station, and then the DRX parameter indicated by the signal or the payload may be acquired. The payload may be transmitted via the channel. Because the DRX parameter is indicated by the signal or the payload, as compared with the related art where high-layer signaling is adopted, in the embodiments of the present disclosure, it is able to improve the flexibility of the DRX parameter, thereby to reduce the power consumption for the UE.

The present disclosure further provides in some embodiments a base station, including a memory, a processor, and a computer program stored in the memory and executed by the processor. The processor is configured to execute the computer program so as to implement the above-mentioned DRX parameter indication method for the base station.

The present disclosure further provides in some embodiments a UE, including a memory, a processor, and a computer program stored in the memory and executed by the processor. The processor is configured to execute the computer program so as to implement the above-mentioned DRX parameter indication method for the UE.

The present disclosure further provides in some embodiments a computer-readable storage medium storing therein a computer program. The computer program is executed by a processor so as to implement the above-mentioned DRX parameter indication method for the base station.

The present disclosure further provides in some embodiments a computer-readable storage medium storing therein a computer program. The computer program is executed by a processor so as to implement the above-mentioned DRX parameter indication method for the UE.

Figure 18:
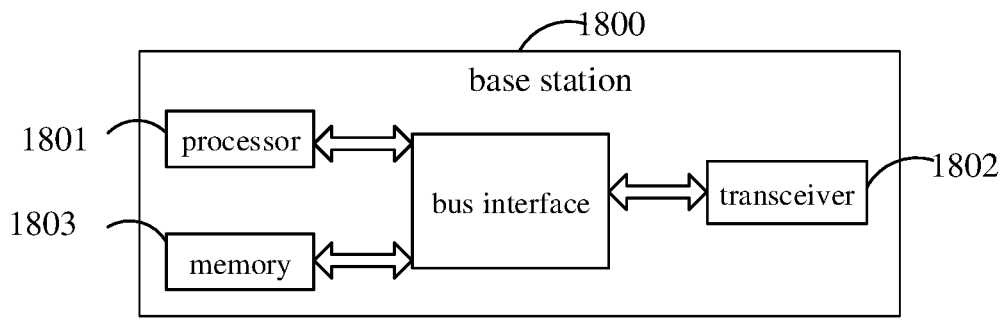
FIG. 18 is yet another schematic view showing the base station according to one embodiment of the present disclosure.

The present disclosure further provides in some embodiments a base station capable of implementing the DRX parameter indication method in FIGS. 2-7 with a same technical effect. As shown in FIG. 18, the base station 1800 may include a processor 1801, a transceiver 1802, a memory 1803, and a bus interface.

In the embodiments of the present disclosure, the base station 1800 may further include a computer program stored in the memory 1803 and executed by the processor 1801. The processor 1801 is configured to execute the computer program so as to: generate a signal or a payload, the signal or payload being used to indicate a DRX parameter; and transmit the signal to a UE, or transmit the payload to the UE via a channel.

The transceiver 1802 is configured to receive and transmit data under the control of the processor 1801. The transceiver 102 may include at least two antenna ports.

In FIG. 18, bus architecture may include a number of buses and bridges connected to each other, so as to connect various circuits for one or more processors 1801 and one or more memories 1803. In addition, as is known in the art, the bus architecture may be used to connect any other circuits, such as a circuit for a peripheral device, a circuit for a voltage stabilizer and a power management circuit. The bus interface may be provided, and the transceiver 1802 may consist of a plurality of elements, i.e., a transmitter and a receiver for communication with any other devices over a transmission medium. With respect to different UEs, a user interface 1804 may also be provided for devices which are to be arranged inside or outside the UE, and these devices may include but not limited to a keypad, a display, a speaker, a microphone and a joystick. The processor 1801 may take charge of managing the bus architecture as well as general processings. The memory 1803 may store therein data for the operation of the processor 1801.

In a possible embodiment of the present disclosure, the signal may include a WUS or a go-to-sleep signal, and the channel may include a wake-up channel or a go-to-sleep channel.

In a possible embodiment of the present disclosure, the DRX parameter may include a time length of an on-duration timer or a DRX cycle.

In a possible embodiment of the present disclosure, the DRX parameter may include at least one of a semi-persistent scheduling cycle, a semi-persistent scheduling resource, a time length of a DRX inactivity timer, a semi-persistent detection cycle of a PDCCH, and a detection pattern of the PDCCH.

In a possible embodiment of the present disclosure, the WUS, the go-to-sleep signal or the payload may be used to indicate the UE to perform the blind detection using a DRX cycle lower by one level than a target DRX cycle, or indicate the UE to perform the blind detection using a DRX cycle higher by one level than the target DRX cycle, or indicate a DRX cycle to be used by the UE for the blind detection. The target DRX cycle may be a DRX cycle currently used by the UE.

In a possible embodiment of the present disclosure, the DRX parameter may further include at least one of a time length of a retransmission timer, a short DRX cycle, and a time length of a short DRX timer. The short DRX cycle may be shorter than a predetermined time length.

In a possible embodiment of the present disclosure, the channel may include the PDCCH.

In a possible embodiment of the present disclosure, the DRX parameter may include at least one of a time length of an on-duration timer, first blind detection information and a DRX cycle. The first blind detection information may be blind detection information for the blind detection performed by the UE on the PDCCH within the time length of the on-duration timer.

In a possible embodiment of the present disclosure, the DRX parameter may include at least one of a semi-persistent scheduling cycle, a semi-persistent scheduling resource, a time length of a DRX inactivity timer, a semi-persistent detection cycle of the PDCCH, a detection pattern of the PDCCH, and second blind detection information. The second blind detection information may be blind detection information used by the UE for the blind detection on the PDCCH within the time length of the DRX inactivity timer.

In a possible embodiment of the present disclosure, the payload may be used to indicate the UE to perform the blind detection using a DRX cycle lower by one level than a target DRX cycle, or indicate the UE to perform the blind detection using a DRX cycle higher by one level than the target DRX cycle, or indicate a DRX cycle to be used by the UE for the blind detection. The target DRX cycle may be a DRX cycle currently used by the UE.

In a possible embodiment of the present disclosure, the first blind detection information may include at least one of a time interval between a start time of the on-duration timer and the payload, an aggregation level of the PDCCH, a type of a search space of the PDCCH, a DCI format to be transmitted via the PDCCH, bandwidth parts occupied by the PDCCH, and a time-frequency-domain resource occupied by the PDCCH.

In a possible embodiment of the present disclosure, the second blind detection information may include at least one of a time interval between a start time of the DRX inactivity timer and the payload, the aggregation level of the PDCCH, the type of the search space of the PDCCH, the DCI format to be transmitted via the PDCCH, the bandwidth parts occupied by the PDCCH, and the time-frequency-domain resource occupied by the PDCCH.

In a possible embodiment of the present disclosure, the processor 1801 is further configured to execute the computer program, so as to transmit the WUS to the UE. The WUS may be used to indicate the UE to detect the payload.

In a possible embodiment of the present disclosure, the WUS may also be used to indicate blind detection information about the payload.

In a possible embodiment of the present disclosure, the blind detection information about the payload may include at least one of a time interval between the payload and the WUS, a time interval between the payload and the go-to-sleep signal, an aggregation level of the payload, a type of a search space of the payload, a DCI format to be transmitted via the payload, and bandwidth parts occupied by the payload.

In a possible embodiment of the present disclosure, the time interval between the payload and the WUS may be pre-configured, or the time interval between the payload and the go-to-sleep signal may be pre-configured.

According to the embodiments of the present disclosure, the signal or the payload for indicating the DRX parameter may be generated, and then the signal may be transmitted to the UE or the payload may be transmitted to the UE via the channel. Because the DRX parameter is indicated by the signal or the payload, as compared with the related art where high-layer signaling is adopted, in the embodiments of the present disclosure, it is able to improve the flexibility of the DRX parameter, thereby to reduce the power consumption for the UE.

Figure 19:
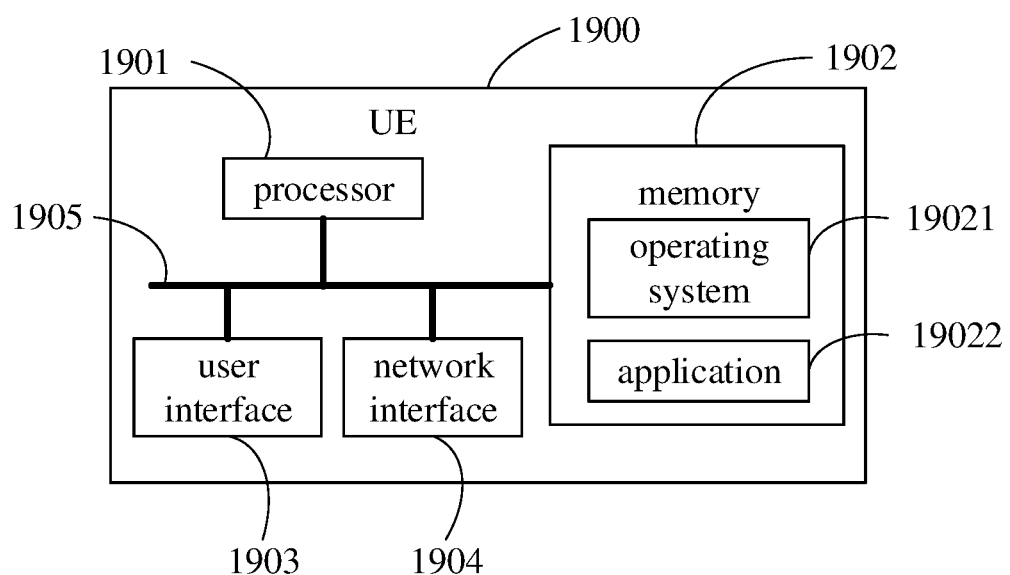
FIG. 19 is still yet another schematic view showing the UE according to one embodiment of the present disclosure.

The present disclosure further provides in some embodiments a UE capable of implementing the DRX parameter indication method in FIG. 11 with a same technical effect. As shown in FIG. 19, the UE 1900 may include at least one processor 1901, a memory 1902, at least one network interface 1904 and a user interface 1903. The components of the UE 1900 may be coupled together through a bus system 1905. It should be appreciated that, the bus system 1305 is configured to achieve connection and communication among the components. Apart from a data bus, the bus system 1905 may further include a power source bus, a control bus and a state signal bus. For clarification, all these buses in FIG. 19 may be collectively called as bus system 1905.

The user interface 1903 may include a display, a keyboard or a pointing device (e.g., mouse, track ball, touch plate or touch panel).

It should be appreciated that, the memory 1902 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 1902 intends to include, but not limited to, the above-mentioned and any other appropriate memories.

In a possible embodiment of the present disclosure, the following elements may be stored in the memory 1902: an executable module or data structure, a subset or an extended set thereof, an operating system 19021 and an application 19022.

The operating system 19021 may include various system programs, e.g., a framework layer, a core layer and a driving layer, so as to implement various basic services and process hardware-based tasks. The application 19022 may include various applications, e.g., Media Player and Browser, so as to implement various application services. The programs for implementing the above-mentioned method may be included in the application 19022.

In the embodiments of the present disclosure, the UE 1900 may further include a computer program stored in the memory 1902 and executed by the processor 1901. The computer program is executed by the processor 1901 so as to: receive a signal or a payload from a base station, the signal or the payload being used to indicate a DRX parameter; and acquire the DRX parameter indicated by the signal or the payload. The payload may be transmitted via a channel.

The above-mentioned method may be applied to, or implemented by, the processor 1901. The processor 1901 may be an integrated circuit (IC) having a signal processing capability. During the implementation, the steps of the above-mentioned method may be completed through an integrated logic circuit of hardware in the processor 1901 or instructions in the form of software. The processor 1901 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 1902, and the processor 1901 may read information stored in the memory 1902 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

In a possible embodiment of the present disclosure, the signal may include a WUS or a go-to-sleep signal, and the channel may include a wake-up channel or a go-to-sleep channel.

In a possible embodiment of the present disclosure, the DRX parameter may include a time length of an on-duration timer or a DRX cycle.

In a possible embodiment of the present disclosure, the DRX parameter may include at least one of a semi-persistent scheduling cycle, a semi-persistent scheduling resource, a time length of a DRX inactivity timer, a semi-persistent detection cycle of a PDCCH, and a detection pattern of the PDCCH.

In a possible embodiment of the present disclosure, the WUS, the go-to-sleep signal or the payload may be used to indicate the UE to perform the blind detection using a DRX cycle lower by one level than a target DRX cycle, or indicate the UE to perform the blind detection using a DRX cycle higher by one level than the target DRX cycle, or indicate a DRX cycle to be used by the UE for the blind detection. The target DRX cycle may be a DRX cycle currently used by the UE.

In a possible embodiment of the present disclosure, the DRX parameter may further include at least one of a time length of a retransmission timer, a short DRX cycle, and a time length of a short DRX timer. The short DRX cycle may be shorter than a predetermined time length.

In a possible embodiment of the present disclosure, the channel may include the PDCCH.

In a possible embodiment of the present disclosure, the DRX parameter may include at least one of a time length of an on-duration timer, first blind detection information and a DRX cycle. The first blind detection information may be blind detection information for the blind detection performed by the UE on the PDCCH within the time length of the on-duration timer.

In a possible embodiment of the present disclosure, the DRX parameter may include at least one of a semi-persistent scheduling cycle, a semi-persistent scheduling resource, a time length of a DRX inactivity timer, a semi-persistent detection cycle of the PDCCH, a detection pattern of the PDCCH, and second blind detection information. The second blind detection information may be blind detection information used by the UE for the blind detection on the PDCCH within the time length of the DRX inactivity timer.

In a possible embodiment of the present disclosure, the processor 1901 is further configured to execute the computer program so as to perform blind detection on the PDCCH in accordance with the DRX parameter after the UE has been woken up.

In a possible embodiment of the present disclosure, the processor 1901 is further configured to execute the computer program so as to receive a PDCCH signal in accordance with the DRX parameter after the UE has been woken up.

In a possible embodiment of the present disclosure, the payload may be used to indicate the UE to perform the blind detection using a DRX cycle lower by one level than a target DRX cycle, or indicate the UE to perform the blind detection using a DRX cycle higher by one level than the target DRX cycle, or indicate a DRX cycle to be used by the UE for the blind detection. The target DRX cycle may be a DRX cycle currently used by the UE.

In a possible embodiment of the present disclosure, the first blind detection information may include at least one of a time interval between a start time of the on-duration timer and the payload, an aggregation level of the PDCCH, a type of a search space of the PDCCH, a DCI format to be transmitted via the PDCCH, bandwidth parts occupied by the PDCCH, and a time-frequency-domain resource occupied by the PDCCH.

In a possible embodiment of the present disclosure, the second blind detection information may include at least one of a time interval between a start time of the DRX inactivity timer and the payload, the aggregation level of the PDCCH, the type of the search space of the PDCCH, the DCI format to be transmitted via the PDCCH, the bandwidth parts occupied by the PDCCH, and the time-frequency-domain resource occupied by the PDCCH.

In a possible embodiment of the present disclosure, the processor 1901 is further configured to execute the computer program so as to: receive a WUS from the base station; and respond to the WUS, and perform blind detection on the payload in accordance with the WUS. The WUS may be used to indicate the UE to detect the payload.

In a possible embodiment of the present disclosure, the processor 1901 is further configured to execute the computer program so as to respond to the WUS, and perform blind detection on the payload in accordance with blind detection information about the payload indicated by the WUS. The WUS may be further used to indicate the blind detection information about the payload.

In a possible embodiment of the present disclosure, the blind detection information about the payload may include at least one of a time interval between the payload and the WUS, a time interval between the payload and the go-to-sleep signal, an aggregation level of the payload, a type of a search space of the payload, a DCI format to be transmitted via the payload, and bandwidth parts occupied by the payload.

In a possible embodiment of the present disclosure, the time interval between the payload and the WUS may be pre-configured, or the time interval between the payload and the go-to-sleep signal may be pre-configured.

According to the embodiments of the present disclosure, the signal or the payload for indicating the DRX parameter may be received from the base station, and then the DRX parameter indicated by the signal or the payload may be acquired. The payload may be transmitted via the channel. Because the DRX parameter is indicated by the signal or the payload, as compared with the related art where high-layer signaling is adopted, in the embodiments of the present disclosure, it is able to improve the flexibility of the DRX parameter, thereby to reduce the power consumption for the UE.

Figure 20:
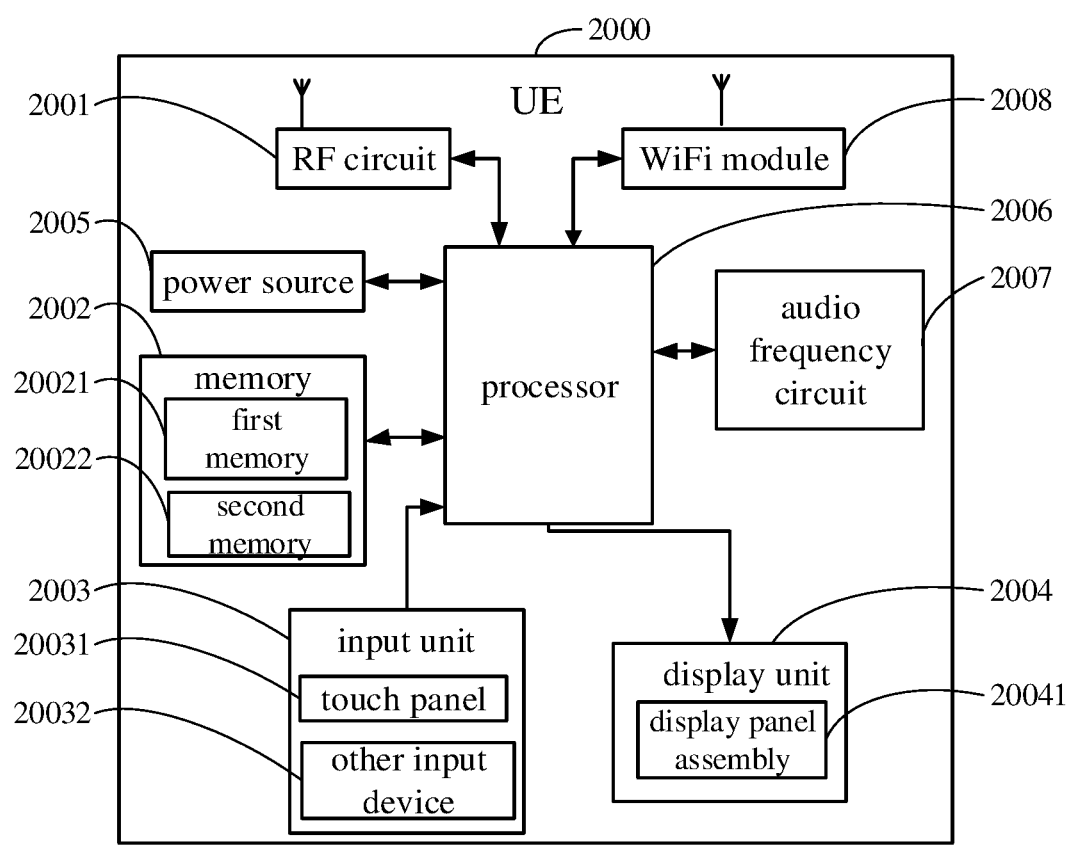
FIG. 20 is still yet another schematic view showing the UE according to one embodiment of the present disclosure.

The present disclosure further provides in some embodiments a UE capable of implementing the above-mentioned blind detection parameter acquisition method in FIG. 11 with a same technical effect. As shown in FIG. 20, the UE 2000 includes a Radio Frequency (RF) circuit 2001, a memory 2002, an input unit 2003, a display unit 2004, a power source 2005, a processor 2006, an audio frequency circuit 2007 and a Wireless Fidelity (WiFi) module 2008.

The input unit 2003 is configured to receive digital or character information inputted by a user, and generate a signal input related to user settings and function control of the UE 2000. To be specific, the input unit 2003 may include a touch panel 20031. The touch panel 20031, also called as touch screen, is configured to collect a touch operation made by the user on or in proximity to the touch panel (e.g., an operation made by the user through any appropriate object or attachment (e.g., finger or stylus) on or in the proximity to the touch panel 20031), and drive a corresponding connection device in accordance with a predetermined program. The touch panel 20031 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 2006, and receive and execute a command from the processor 2006. In addition, the touch panel 20031 may be of a resistive type, a capacitive type, an infrared type or a surface acoustic wave (SAW) type. Apart from the touch panel 20031, the input unit 2003 may further include an input device 20032 which may include, but not limited to, a physical keyboard, a functional button (e.g., a volume control button or an on/off button), a trackball, a mouse, and a joystick, which will not be particularly defined herein.

The display unit 2004 is configured to display information inputted by the user or information to be presented to the user, and various interfaces for the UE 2000, and it may include a display panel 20041. In a possible embodiment of the present disclosure, the display panel 20041 may be a Liquid Crystal Display (LCD) panel or an Organic Light-Emitting Diode (OLED) panel.

It should be appreciated that, the touch panel 20031 may cover the display panel 20041, so as to form a touch display panel. When the touch operation made on or in proximity to the touch display panel has been detected, the touch information may be transmitted to the processor 2006 so as to determine a type of a touch event. Then, the processor 2006 may provide corresponding visual output on the touch display panel in accordance with the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other. The application interface display region may be adopted to display interfaces for applications, and each interface may include an icon for at least one application and/or an interface element such as Widget desktop control. The application interface display region may also be a blank interface where no content is contained. The commonly-used controls display region may be adopted to display controls which are used frequently, e.g., setting button, interface number, scroll bar, or such application icons as telephone book icon.

The processor 2006 may be a control center of the UE 2000, and connected to each member of the entire UE via various interfaces and lines. The processor 2006 is configured to run or execute software programs and/or modules stored in a first memory 20020, and call data stored in a second memory 20022, so as to achieve various functions of the UE 2000 and process the data, thereby to monitor the UE 2000. In a possible embodiment of the present disclosure, the processor 2006 may include one or more processing units.

In the embodiments of the present disclosure, through calling a software program and/or a module stored in the first memory 20020 and/or the data stored in the second memory 20022, the processor 2006 is configured to: receive a signal or a payload from a base station, the signal or the payload being used to indicate a DRX parameter; and acquire the DRX parameter indicated by the signal or the payload. The payload may be transmitted via a channel.

In a possible embodiment of the present disclosure, the signal may include a WUS or a go-to-sleep signal, and the channel may include a wake-up channel or a go-to-sleep channel.

In a possible embodiment of the present disclosure, the DRX parameter may include a time length of an on-duration timer or a DRX cycle.

In a possible embodiment of the present disclosure, the DRX parameter may include at least one of a semi-persistent scheduling cycle, a semi-persistent scheduling resource, a time length of a DRX inactivity timer, a semi-persistent detection cycle of a PDCCH, and a detection pattern of the PDCCH.

In a possible embodiment of the present disclosure, the WUS, the go-to-sleep signal or the payload may be used to indicate the UE to perform the blind detection using a DRX cycle lower by one level than a target DRX cycle, or indicate the UE to perform the blind detection using a DRX cycle higher by one level than the target DRX cycle, or indicate a DRX cycle to be used by the UE for the blind detection. The target DRX cycle may be a DRX cycle currently used by the UE.

In a possible embodiment of the present disclosure, the DRX parameter may further include at least one of a time length of a retransmission timer, a short DRX cycle, and a time length of a short DRX timer. The short DRX cycle may be shorter than a predetermined time length.

In a possible embodiment of the present disclosure, the channel may include the PDCCH.

In a possible embodiment of the present disclosure, the DRX parameter may include at least one of a time length of an on-duration timer, first blind detection information and a DRX cycle. The first blind detection information may be blind detection information for the blind detection performed by the UE on the PDCCH within the time length of the on-duration timer.

In a possible embodiment of the present disclosure, the DRX parameter may include at least one of a semi-persistent scheduling cycle, a semi-persistent scheduling resource, a time length of a DRX inactivity timer, a semi-persistent detection cycle of the PDCCH, a detection pattern of the PDCCH, and second blind detection information. The second blind detection information may be blind detection information used by the UE for the blind detection on the PDCCH within the time length of the DRX inactivity timer.

In a possible embodiment of the present disclosure, the processor 2006 is further configured to call the software program and/or module stored in the first memory 20020 and the data stored in the second memory 20022, so as to perform blind detection on the PDCCH in accordance with the DRX parameter after the UE has been woken up.

In a possible embodiment of the present disclosure, the processor 2006 is further configured to call the software program and/or module stored in the first memory 20020 and the data stored in the second memory 20022, so as to receive a PDCCH signal in accordance with the DRX parameter after the UE has been woken up.

In a possible embodiment of the present disclosure, the payload may be used to indicate the UE to perform the blind detection using a DRX cycle lower by one level than a target DRX cycle, or indicate the UE to perform the blind detection using a DRX cycle higher by one level than the target DRX cycle, or indicate a DRX cycle to be used by the UE for the blind detection. The target DRX cycle may be a DRX cycle currently used by the UE.

In a possible embodiment of the present disclosure, the first blind detection information may include at least one of a time interval between a start time of the on-duration timer and the payload, an aggregation level of the PDCCH, a type of a search space of the PDCCH, a DCI format to be transmitted via the PDCCH, bandwidth parts occupied by the PDCCH, and a time-frequency-domain resource occupied by the PDCCH.

In a possible embodiment of the present disclosure, the second blind detection information may include at least one of a time interval between a start time of the DRX inactivity timer and the payload, the aggregation level of the PDCCH, the type of the search space of the PDCCH, the DCI format to be transmitted via the PDCCH, the bandwidth parts occupied by the PDCCH, and the time-frequency-domain resource occupied by the PDCCH.

In a possible embodiment of the present disclosure, the processor 2006 is further configured to call the software program and/or module stored in the first memory 20020 and the data stored in the second memory 20022, so as to: receive a WUS from the base station; and respond to the WUS, and perform blind detection on the payload in accordance with the WUS. The WUS may be used to indicate the UE to detect the payload.

In a possible embodiment of the present disclosure, the processor 2006 is further configured to call the software program and/or module stored in the first memory 20020 and the data stored in the second memory 20022, so as to respond to the WUS, and perform blind detection on the payload in accordance with blind detection information about the payload indicated by the WUS. The WUS may be further used to indicate the blind detection information about the payload.

In a possible embodiment of the present disclosure, the blind detection information about the payload may include at least one of a time interval between the payload and the WUS, a time interval between the payload and the go-to-sleep signal, an aggregation level of the payload, a type of a search space of the payload, a DCI format to be transmitted via the payload, and bandwidth parts occupied by the payload.

In a possible embodiment of the present disclosure, the time interval between the payload and the WUS may be pre-configured, or the time interval between the payload and the go-to-sleep signal may be pre-configured.

According to the embodiments of the present disclosure, the signal or the payload for indicating the DRX parameter may be received from the base station, and then the DRX parameter indicated by the signal or the payload may be acquired. The payload may be transmitted via the channel. Because the DRX parameter is indicated by the signal or the payload, as compared with the related art where high-layer signaling is adopted, in the embodiments of the present disclosure, it is able to improve the flexibility of the DRX parameter, thereby to reduce the power consumption for the UE.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Discontinuous Reception (DRX) parameter indication method applied for a base station, comprising:
    generating a signal or a payload, the signal or the payload being used to indicate a DRX parameter; and
    transmitting the signal to a User Equipment (UE), or transmitting the payload to the UE via a channel;
    wherein the signal comprises a wake-up signal (WUS) or a go-to-sleep signal, and the channel comprises a wake-up channel or a go-to-sleep channel;
    wherein the DRX parameter comprises at least one of first blind detection information, a semi-persistent scheduling cycle, a semi-persistent detection cycle of a Physical Downlink Control Channel (PDCCH), a detection pattern of the PDCCH, or second blind detection information, the first blind detection information is blind detection information for the blind detection performed by the UE on the PDCCH within a time length of an on-duration timer, and the second blind detection information is blind detection information used by the UE for the blind detection on the PDCCH within a time length of a DRX inactivity timer;

wherein the first blind detection information comprises at least one of an aggregation level of the PDCCH, a Downlink Control Information (DCI) format to be transmitted via the PDCCH, bandwidth parts occupied by the PDCCH, or a time-frequency-domain resource occupied by the PDCCH;

wherein the second blind detection information comprises at least one of a time interval between a start time of the DRX inactivity timer and the payload, the aggregation level of the PDCCH, the type of the search space of the PDCCH, the DCI format to be transmitted via the PDCCH, the bandwidth parts occupied by the PDCCH, or the time-frequency-domain resource occupied by the PDCCH;

wherein the wake-up channel comprises a wake-up PDCCH channel, or the go-to-sleep channel comprises a go-to-sleep PDCCH channel;

wherein prior to transmitting the payload to the UE via the channel, the DRX parameter indication method further comprises transmitting the WUS to the UE, wherein the WUS is used to indicate the UE to detect the payload.

2. The DRX parameter indication method according to claim 1, wherein the DRX parameter comprises the time length of the on-duration timer or a DRX cycle.

3. The DRX parameter indication method according to claim 2, wherein the DRX parameter further comprises at least one of a time length of a retransmission timer, a short DRX cycle, or a time length of a short DRX timer, wherein the short DRX cycle is shorter than a predetermined time length.

4. The DRX parameter indication method according to claim 2, wherein the WUS, the go-to-sleep signal or the payload is used to indicate the UE to perform the blind detection using a DRX cycle lower by one level than a target DRX cycle, or indicate the UE to perform the blind detection using a DRX cycle higher by one level than the target DRX cycle, or indicate the DRX cycle to be used by the UE for the blind detection, wherein the target DRX cycle is a DRX cycle currently used by the UE.

5. The DRX parameter indication method according to claim 1, wherein the DRX parameter comprises at least one of a semi-persistent scheduling resource or the time length of the DRX inactivity timer.

6. The DRX parameter indication method according to claim 1, wherein the DRX parameter further comprises at least one of the time length of the on-duration timer.

7. The DRX parameter indication method according to claim 6, wherein the DRX parameter further comprises at least one of a semi-persistent scheduling resource or the time length of the DRX inactivity timer.

8. The DRX parameter indication method according to claim 7, wherein the first blind detection information further comprises at least one of a time interval between a start time of the on-duration timer and the payload or a type of a search space of the PDCCH.

9. The DRX parameter indication method according to claim 6, wherein the payload is further used to indicate the UE to perform the blind detection using a DRX cycle lower by one level than a target DRX cycle, or indicate the UE to perform the blind detection using a DRX cycle higher by one level than the target DRX cycle, or indicate the DRX cycle to be used by the UE for the blind detection, wherein the target DRX cycle is a DRX cycle currently used by the UE.

10. The DRX parameter indication method according to claim 1, wherein the WUS is further used to indicate blind detection information of the payload.

11. The DRX parameter indication method according to claim 10, wherein the blind detection information of the payload comprises at least one of a time interval between the payload and the WUS, a time interval between the payload and the go-to-sleep signal, an aggregation level of the payload, a type of a search space of the payload, a DCI format to be transmitted via the payload, or bandwidth parts occupied by the payload.

12. The DRX parameter indication method according to claim 11, wherein the time interval between the payload and the WUS is pre-configured, or the time interval between the payload and the go-to-sleep signal is pre-configured.

13. A DRX parameter indication method applied for a UE, comprising:

receiving a signal or a payload from a base station, the signal or the payload being used to indicate a DRX parameter; and acquiring the DRX parameter indicated by the signal or the payload, wherein the signal comprises a wake-up signal (WUS) or a go-to-sleep signal, the payload is transmitted via a channel, and the channel comprises a wake-up channel or a go-to-sleep channel;

wherein the DRX parameter comprises at least one of first blind detection information, a semi-persistent scheduling cycle, a semi-persistent detection cycle of the PDCCH, a detection pattern of the PDCCH, or second blind detection information, the first blind detection information is blind detection information for the blind detection performed by the UE on the PDCCH within a time length of an on-duration timer, and the second blind detection information is blind detection information used by the UE for the blind detection on the PDCCH within a time length of a DRX inactivity timer;

wherein the first blind detection information comprises at least one of an aggregation level of the PDCCH, a Downlink Control Information (DCI) format to be transmitted via the PDCCH, bandwidth parts occupied by the PDCCH, or a time-frequency-domain resource occupied by the PDCCH;

wherein the second blind detection information comprises at least one of a time interval between a start time of the DRX inactivity timer and the payload, the aggregation level of the PDCCH, the type of the search space of the PDCCH, the DCI format to be transmitted via the PDCCH, the bandwidth parts occupied by the PDCCH, or the time-frequency-domain resource occupied by the PDCCH;

wherein the wake-up channel comprises a wake-up PDCCH channel, or the go-to-sleep channel comprises a go-to-sleep PDCCH channel;

wherein prior to receiving the signal or the payload from the base station, the DRX parameter indication method further comprises receiving a WUS from the base station, wherein the receiving the payload from the base station comprises responding to the WUS, and performing blind detection on the payload in accordance with the WUS, and wherein the WUS is used to indicate the UE to detect the payload.

14. The DRX parameter indication method according to claim 13, wherein subsequent to acquiring the DRX parameter indicated by the signal or the payload, the DRX parameter indication method further comprises receiving a PDCCH signal and performing blind detection on the PDCCH in accordance with the DRX parameter after the UE has been woken up.

15. The DRX parameter indication method according to claim 13, wherein the DRX parameter further comprises at least one of the time length of the on-duration timer, or a DRX cycle.

16. The DRX parameter indication method according to claim 15, wherein the payload is further used to indicate the UE to perform the blind detection using a DRX cycle lower by one level than a target DRX cycle, or indicate the UE to perform the blind detection using a DRX cycle higher by one level than the target DRX cycle, or indicate the DRX cycle to be used by the UE for the blind detection, wherein the target DRX cycle is a DRX cycle currently used by the UE.

17. The DRX parameter indication method according to claim 13, wherein the DRX parameter further comprises at least one of a semi-persistent scheduling resource, or the time length of the DRX inactivity timer.

18. The DRX parameter indication method according to claim 17, wherein the first blind detection information further comprises at least one of a time interval between a start time of the on-duration timer and the payload or a type of a search space of the PDCCH.

19. UE, comprising a memory, a processor, and a computer program stored in the memory and executed by the processor, wherein the processor is configured to execute the computer program so as to implement:
receiving a signal or a payload from a base station, the signal or the payload being used to indicate a DRX parameter; and
acquiring the DRX parameter indicated by the signal or the payload,
wherein the signal comprises a wake-up signal (WUS) or a go-to-sleep signal, the payload is transmitted via a channel, and the channel comprises a wake-up channel or a go-to-sleep channel;
wherein the DRX parameter comprises at least one of first blind detection information, a semi-persistent scheduling cycle, a semi-persistent detection cycle of the PDCCH, a detection pattern of the PDCCH, or second blind detection information, the first blind detection information is blind detection information for the blind detection performed by the UE on the PDCCH within a time length of an on-duration timer, and the second blind detection information is blind detection information used by the UE for the blind detection on the PDCCH within a time length of a DRX inactivity timer;
wherein the first blind detection information comprises at least one of an aggregation level of the PDCCH, a Downlink Control Information (DCI) format to be transmitted via the PDCCH, bandwidth parts occupied by the PDCCH, or a time-frequency-domain resource occupied by the PDCCH;
wherein the second blind detection information comprises at least one of a time interval between a start time of the DRX inactivity timer and the payload, the aggregation level of the PDCCH, the type of the search space of the PDCCH, the DCI format to be transmitted via the PDCCH, the bandwidth parts occupied by the PDCCH, or the time-frequency-domain resource occupied by the PDCCH;
wherein the wake-up channel comprises a wake-up PDCCH channel, or the go-to-sleep channel comprises a go-to-sleep PDCCH channel;
wherein prior to receiving the signal or the payload from the base station, the processor is further configured to execute the computer program so as to implement receiving a WUS from the base station, wherein the receiving the payload from the base station comprises responding to the WUS, and performing blind detection on the payload in accordance with the WUS, and wherein the WUS is used to indicate the UE, to detect the payload.

20. The UE according to claim 19, wherein subsequent to acquiring the DRX parameter indicated by the signal or the payload, the processor is further configured to execute the computer program so as to implement receiving a PDCCH signal and performing blind detection on the PDCCH in accordance with the DRX parameter after the UE has been woken up.

* * * * *